US011368519B2

(12) United States Patent
Gill et al.

(10) Patent No.: US 11,368,519 B2
(45) Date of Patent: *Jun. 21, 2022

(54) ARCHITECTURE FOR MANAGING I/O AND STORAGE FOR A VIRTUALIZATION ENVIRONMENT USING EXECUTABLE CONTAINERS AND VIRTUAL MACHINES

(71) Applicant: Nutanix, Inc., San Jose, CA (US)

(72) Inventors: Binny Sher Gill, San Jose, CA (US); Karan Gupta, San Jose, CA (US); Miao Cui, New York, NY (US)

(73) Assignee: Nutanix, Inc., San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/947,098

(22) Filed: Jul. 17, 2020

(65) Prior Publication Data
US 2020/0351333 A1 Nov. 5, 2020

Related U.S. Application Data

(63) Continuation of application No. 15/173,577, filed on Jun. 3, 2016, now Pat. No. 10,721,290.

(60) Provisional application No. 62/171,990, filed on Jun. 5, 2015.

(51) Int. Cl.
H04L 67/10 (2022.01)
H04L 67/1097 (2022.01)
(Continued)

(52) U.S. Cl.
CPC .......... *H04L 67/10* (2013.01); *G06F 9/45558* (2013.01); *H04L 67/1097* (2013.01);
(Continued)

(58) Field of Classification Search
CPC . H04L 67/10; H04L 67/1097; H04L 61/2525; H04L 61/2514; G06F 9/45558; G06F 2009/45595; G06F 2009/45579
See application file for complete search history.

(56) References Cited

U.S. PATENT DOCUMENTS 8,381,231 B2 2/2013 Kacin et al.
8,549,518 B1 10/2013 Aron et al.
(Continued)

OTHER PUBLICATIONS

Non-Final Office Action dated May 23, 2018 for related U.S. Appl. No. 15/173,577.
(Continued)

*Primary Examiner* — Michael A Keller
(74) *Attorney, Agent, or Firm* — Vista IP Law Group, LLP

(57) ABSTRACT

Systems for high-performance computing. A storage control architecture is implemented by a plurality of nodes, where a node comprises combinations of executable containers that execute in cooperation with virtual machines running above a hypervisor. The containers run in a virtual machine above a hypervisor, and/or can be integrated directly into the operating system of a host node. Sensitive information such as credit card information may be isolated from the containers in a separate virtual machine that is configured to be threat resistant, and which can be accessed through a threat resistant interface module. One of the virtual machines of the node may be a node-specific control virtual machine that is configured to operate as a dedicated storage controller for a node. One of the virtual machines of the node may be a node-specific container service machine that is configured to provide storage-related and other support to a hosted executable container.

25 Claims, 26 Drawing Sheets

(51) Int. Cl.
*G06F 9/455* (2018.01)
*H04L 61/2521* (2022.01)
*H04L 61/2514* (2022.01)

(52) U.S. Cl.
CPC .............. *G06F 2009/45579* (2013.01); *H04L 61/2514* (2013.01); *H04L 61/2525* (2013.01)

(56) References Cited

U.S. PATENT DOCUMENTS

| | | | |
|---|---|---|---|
| 8,601,473 | B1 | 12/2013 | Aron et al. |
| 8,649,771 | B1 | 2/2014 | Faaborg et al. |
| 8,850,130 | B1 | 9/2014 | Aron et al. |
| 9,223,966 | B1 | 12/2015 | Satish et al. |
| 9,342,784 | B1* | 5/2016 | Rajagopal ............. G06F 11/008 |
| 9,772,866 | B1 | 9/2017 | Aron et al. |
| 9,800,517 | B1 | 10/2017 | Anderson |
| 2005/0091213 | A1 | 4/2005 | Schutz et al. |
| 2006/0059230 | A1 | 3/2006 | Dykas et al. |
| 2007/0083512 | A1 | 4/2007 | Pepin et al. |
| 2007/0198656 | A1 | 8/2007 | Mazzaferri et al. |
| 2007/0260831 | A1 | 11/2007 | Michael et al. |
| 2009/0217296 | A1 | 8/2009 | Gebhart et al. |
| 2009/0300414 | A1 | 12/2009 | Huang et al. |
| 2009/0307435 | A1 | 12/2009 | Nevarez et al. |
| 2011/0078790 | A1 | 3/2011 | Fazunenko et al. |
| 2011/0185292 | A1 | 7/2011 | Chawla et al. |
| 2012/0005673 | A1 | 1/2012 | Cervantes et al. |
| 2012/0110574 | A1 | 5/2012 | Kumar |
| 2012/0117562 | A1 | 5/2012 | Jess et al. |
| 2012/0151568 | A1 | 6/2012 | Pieczul et al. |
| 2012/0167079 | A1 | 6/2012 | Banerjee et al. |
| 2012/0191908 | A1 | 7/2012 | North et al. |
| 2013/0185715 | A1 | 7/2013 | Dunning et al. |
| 2013/0198828 | A1 | 8/2013 | Pendergrass et al. |
| 2013/0275886 | A1 | 10/2013 | Haswell et al. |
| 2013/0290399 | A1 | 10/2013 | Gordon |
| 2014/0020043 | A1 | 1/2014 | Anand et al. |
| 2014/0052864 | A1 | 2/2014 | Der et al. |
| 2014/0075426 | A1 | 3/2014 | West et al. |
| 2014/0082634 | A1 | 3/2014 | Hickford et al. |
| 2014/0201317 | A1 | 7/2014 | Nerieri |
| 2014/0222930 | A1 | 8/2014 | Gangadharan et al. |
| 2014/0297713 | A1 | 10/2014 | Meigen et al. |
| 2014/0304700 | A1 | 10/2014 | Kim et al. |
| 2014/0359619 | A1 | 12/2014 | Park et al. |
| 2015/0089577 | A1 | 3/2015 | Beckman et al. |
| 2015/0121375 | A1 | 4/2015 | Balasubramanyam et al. |
| 2015/0135338 | A1 | 5/2015 | Moskal |
| 2015/0143091 | A1* | 5/2015 | Brace ................. G06F 9/44505 713/1 |
| 2015/0261951 | A1 | 9/2015 | Abuelsaad et al. |
| 2015/0271256 | A1 | 9/2015 | Pathak et al. |
| 2015/0331722 | A1 | 11/2015 | Magro et al. |
| 2016/0105392 | A1 | 4/2016 | Thakkar et al. |
| 2016/0147558 | A1 | 5/2016 | Gaponenko et al. |
| 2016/0301680 | A1 | 10/2016 | Main et al. |
| 2016/0342453 | A1 | 11/2016 | Khan et al. |
| 2016/0359955 | A1 | 12/2016 | Gill et al. |
| 2016/0378518 | A1 | 12/2016 | Antony et al. |
| 2016/0381080 | A1 | 12/2016 | Reddem et al. |
| 2017/0046134 | A1 | 2/2017 | Straub |
| 2017/0102925 | A1 | 4/2017 | Ali et al. |
| 2017/0177171 | A1 | 6/2017 | Won |
| 2017/0255890 | A1 | 9/2017 | Palavalli et al. |
| 2017/0272472 | A1 | 9/2017 | Adhar |

OTHER PUBLICATIONS

Non-Final Office Action dated May 31, 2018 for related U.S. Appl. No. 15/431,404.
Wikipedia. "Remote direct memory access". Mar. 20, 2015. 2 pages.
International Search Report and Written Opinion dated Sep. 8, 2016 for corresponding PCT Patent Application No. PCT/US16/35929, 10 pages.
Non-Final Office Action dated Jan. 31, 2018 for related U.S. Appl. No. 15/173,577.
Wikipedia. "LXC". Apr. 18, 2017. 3 pages.
Wikipedia. "HTML element". Apr. 10, 2017. 7 pages.
U.S. Appl. No. 15/431,404, filed Feb. 13, 2017, 71 pages.
U.S. Appl. No. 15/665,079, filed Jul. 31, 2017, 76 pages.
European Search Report dated May 9, 2018 for EP Application No. 16804612.6, 7 pages.
Merkel, D. "Docker: Lightweight Linux Containers for Consistent Development and Deployment". Mar. 2014. 16 pages.
Non-Final Office Action dated Jan. 19, 2018 for related U.S. Appl. No. 15/360,077.
Final Office Action dated Jun. 20, 2018 for related U.S. Appl. No. 15/3 60,077.
Non-Final Office Action dated Jul. 19, 2018 for related U.S. Appl. No. 15/665,079.
Final Office Action dated Sep. 24, 2018 for related U.S. Appl. No. 15/173,577, 16 pages.
Final Office Action dated Oct. 3, 2018 for related U.S. Appl. No. 15/431,404, 24 pages.
Non-Final Office Action dated Oct. 25, 2018 for related U.S. Appl. No. 15/360,077, 20 pages.
Non-Final Office Action dated Jan. 9, 2019 for related U.S. Appl. No. 15/173,577, 10 pages.
Final Office Action dated Jan. 23, 2019 for related U.S. Appl. No. 15/665,079, 16 pages.
Pahl, Claus. "Containers and Clusters for Edge Cloud Architectures—a Technology Review". Oct. 26, 2015. 8 pages.
Rotter et al. "Using Linux Containers in Telecom Applications". Mar. 3, 2016. 8 pages.
Bernstein, David. "Containers and Cloud: From LXC to Docker to Kubernetes". IEEE Cloud Computing. Sep. 2014. 4 pages.
Gerlach et al. "Skyport—Container-Based Execution Environment Management for Multi-cloud Scientific Workflows". Nov. 2014. 9 pages.
Burns et al. "Design patterns for container-based distributed systems". HotCloud'16 Proceedings of the 8th USENIX Conference on Hot Topics in Cloud Computing. Jun. 12, 2016. 6 pages.
Marmol et al. "Networking in Containers and Container Clusters". Proceedings of netdev 0.1. Feb. 17, 2015. 4 pages.
Arnautov et al. "SCONE: Secure Linux Containers with Intel SGX". Nov. 4, 2016. 17 pages.
Burns et al. "Borg, Omega, and Kubernetes". ACM Queue, vol. 14 (2016), pp. 70-93.
Singh, Satnam. "Cluster-level Logging of Containers with Containers". ACM Queue, vol. 14, issue 3, Jun. 28, 2016. 24 pages.
Non-Final Office Action dated Mar. 8, 2019 for related U.S. Appl. No. 15/674,923, 10 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.

(56) References Cited

OTHER PUBLICATIONS

Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Mar. 29, 2019 for related U.S. Appl. No. 15/620,486.
Non-Final Office Action dated Apr. 4, 2019 for related U.S. Appl. No. 15/431,404.
Srivastav, P. "What is Docker?" (Jan. 10, 2016) date identified by Google, from https: //docker-curriculum.com/#give-feedb ack.
Evans, C. "Working With Containers #1: Getting Started with Docker" (Feb. 1, 2016) from https://blog.architecting.it/working-with-containers-1-getting-started-with-docker/.
Baldwin, M. "Configure a Docker Container to Automatically Pull From GitHub Using Oauth" (Feb. 19, 2015), from https://devops.ionos.com/tutorials/configure-a-docker-container-to-automatically-pull-from-github-using-oauth/.
Hall, S. "Supergiant Builds on Kubernetes to Manage Multitenancy for Distributed Applications" (Sep. 21, 2016), from https://thenewstack.io/supergiant-builds-kubernetes-manage-multi-tenancy-distributed-applications/.
Hom, C. "Kubernetes Cluster Federation: Efficiently deploy and manage applications across the globe" (Jul. 21, 2016), from https://coreos.com/blog/kubernetes-cluster-federation.html.
Sanchez, G. "Drive a full lifecycle with Jenkins + Kubernetes" (Oct. 20, 2016), from http s: //elasticbox.com/blog/.
StackPointCloud: "Node Autoscaling, Docker to Kubernetes Onboarding Tools & Production Fabric8 for Developers" (Oct. 27, 2016), from https://blog.stackpoint.io/node-autoscaling-docker-to-kubernetes-onboarding-tools-production-fabric8-for-developers-8e77a4a237b2.
Strachan, J. "the easiest way to get started with fabrics on the public cloud is now StackPointCloud!" (Oct. 31, 2016), from https://blog.fabric8.io/the-easiest-way-to-get-started-with-fabric8-on-the-public-cloud-is-now-stackpointcloud-2f2083d91bf4.
Tost et al. "Build and extend Docker container images with middleware functions" (Aug. 22, 2016), from https://developer.IBM.com/tutorials/mw-1608-tost-trs/.
Kumar et al. "Creating and Managing Docker VM Extensions in Azure" (Oct. 15, 2015), from https://www.red-gate.com/simple-talk/cloud/platform-as-a-service/creating-and-managing-docker-vm-extensions-in-azure/.
"Working with Docker" (Apr. 4, 2019), from https://code.visualstudio.com/docs/azure/docker.
Sullivan, A. "NetApp Persistent Storage in Kubernetes: Using ONTAP and NFS" (May 11, 2016), from https://netapp.io/2016/05/11/netapp-persistent-storage-kubernetes-using-ontap-nfs/.
Sullivan, A. "Are Docker Containers Right for Your Enterprise Applications?" (Apr. 19, 2016), from https://blog.netapp.com/blogs/are-docker-containers-right-for-your-enterprise-applications/.
Younes, R. "Dockerizing a PHP Application" (Mar. 9, 2016), from https://semaphoreci.com/community/tutorials/dockerizing-a-php-application.
Final Office Action dated May 10, 2019 for related U.S. Appl. No. 15/360,077.
Final Office Action dated Jul. 5, 2019 for related U.S. Appl. No. 15/173,577.
Non-Final Office Action dated Aug. 6, 2019 for related U.S. Appl. No. 15/360,077.
Final Office Action dated Sep. 18, 2019 for related U.S. Appl. No. 15/674,923.
Final Office Action dated Oct. 10, 2019 for related U.S. Appl. No. 15/431,404.
Non-Final Office Action dated Oct. 23, 2019 for related U.S. Appl. No. 15/173,577.
Cano, I. et al., "Curator: Self-Managing Storage for Enterprise Clusters", 14th USENIX Symposium on Networked Systems Design and Implementation, NSDI '17, (Mar. 27, 2017).
Advisory Action dated Dec. 26, 2019 for related U.S. Appl. No. 15/431,404.
Notice of Allowance dated Jan. 8, 2020 for related U.S. Appl. No. 15/360,077.
Notice of Allowance dated Mar. 6, 2020 for related U.S. Appl. No. 15/431,404.
Notice of Allowance dated Mar. 9, 2020 for related U.S. Appl. No. 15/173,577.
Schwarzkopf, M. et al., "Omega: flexible, scalable schedulers for large compute clusters", *EuroSys'*, (Apr. 15-17, 2013).
Peinl, R et al., "The Docker Ecosystem Needs Consolidation", In *Proceedings of the 5th International Conference on Cloud Computing and Services Science* (May 2015).
Kukrai, T., "Migration of Virtual Machines in the Computing Cloud", Master thesis, Czech Technical University in Prague, (Sep. 2014).
Rotter, C. et al., "Using Linux Containers in Telecom Applications", *19th International ICIN Conference—Innovations in Clouds, Internet and Networks*, (Mar. 1-3, 2016).
Cacciatore, K. et al., "Exploring Opportunities: Containers and OpenStack", Openstack White Paper, (2015).
Truong, P. et al., "Architecture of the DOCTOR Virtualized Node", Version 1.0, (Dec. 21, 2015).
Casalicchio, E., "Autonomic Orchestration of Containers: Problem Definition and Research Challenges", *10th EAI International Conference on Performance Evaluation Methodologies and Tools*, (Jan. 2017).
INTEL, "Linux* Containers Streamline Virtualization and Complement Hypervisor-Based Virtual Machines", White Paper, (Sep. 2014).
Lamourine, M., "Storage Options for Software Containers", vol. 40, No. 1, *Usenix*, (Feb. 2015).
Burns, B., "How Kubernetes Changes Operations", vol. 40, No. 5, Usenix, (Oct. 2015).
Farrow, R. et al., "Operating Systems and Sysadmin", vol. 40, No. 5, *Usenix*, (Oct. 2015).
Saarinen, T., "Container-based video processing", Master's Thesis, (May 6, 2015).
Moglia, L. "Control plane performance comparison in virtualized Base Station Controller", Master of Science Thesis, (Mar. 2015).
Marmol, V. et al., "Networking in Containers and Container Clusters", *Proceedings of netdev* 0.1, (Feb. 14-17, 2015).
Morgan, T. M., "Photon Container Platform Closer to Prime Time", The Next Platform, (Mar. 21, 2016).
Sleinholt, R., "A study of Linux Containers and their ability to quickly offer scalability for web services", Master's Thesis, (May 18, 2015).
Hayden, M., "Securing Linux Containers", (Jul. 26, 2015).
Jurenka, V., "Virtualization using Docker Platform", Master's Thesis, (Jan. 2015).
Piraghaj, S. F. et al. "Efficient Virtual Machine Sizing for Hosting Containers as a Service", *IEEEServices2015*, (Jun. 2015).
Morgan, T. P. "VMware Blunts Container Attack With Bonneville VM", The Next Platform, (Jun. 23, 2015).
Warfield, A. et al., "Converging Enterprise Storage and Business Intelligence: A Reference Architecture for Data-Centric Infrastructure", v1.0, Intel, (Aug. 2015).
European Office Action dated Aug. 3, 2021 for EP Application No. 16804612.6.

* cited by examiner

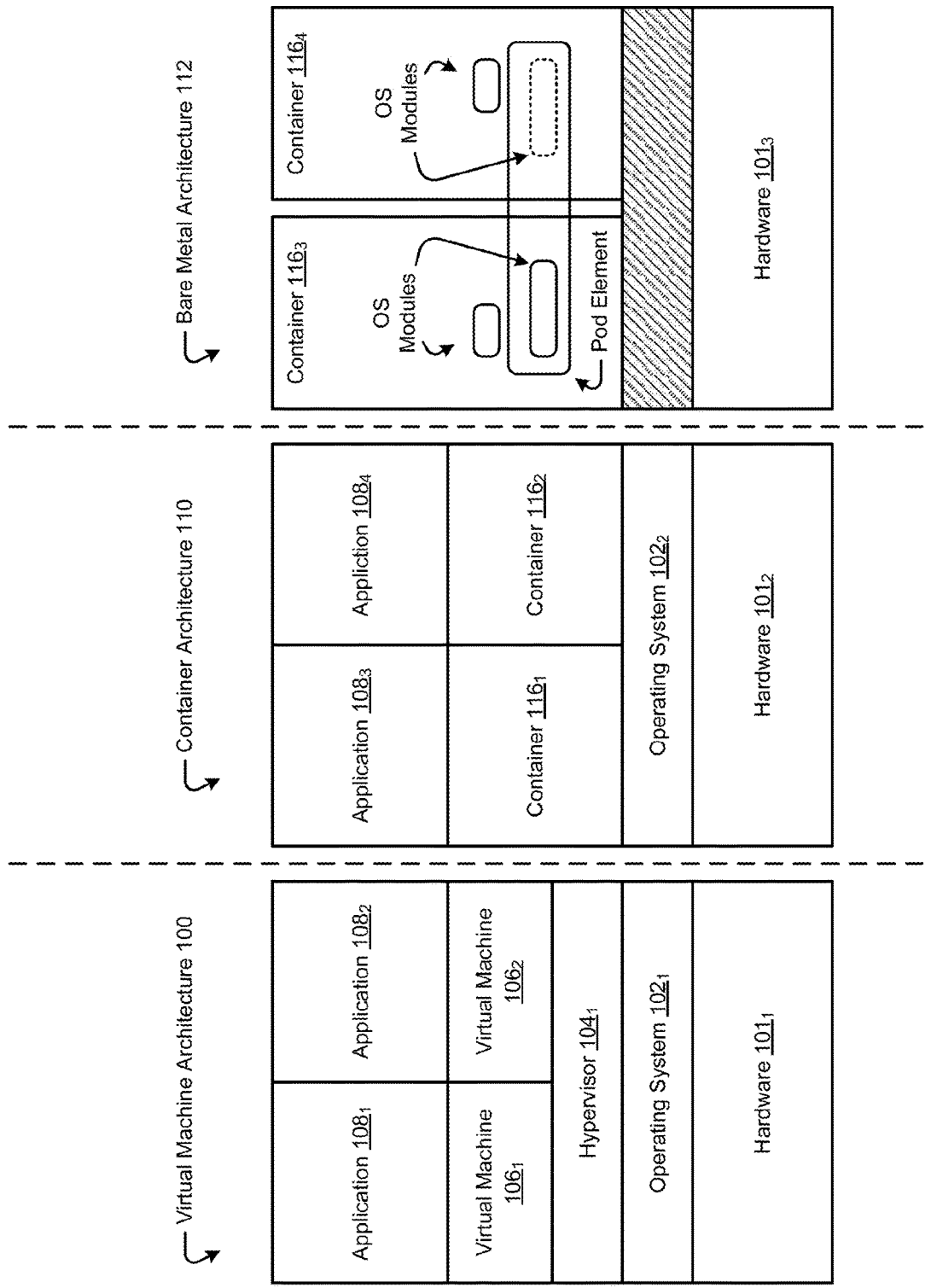

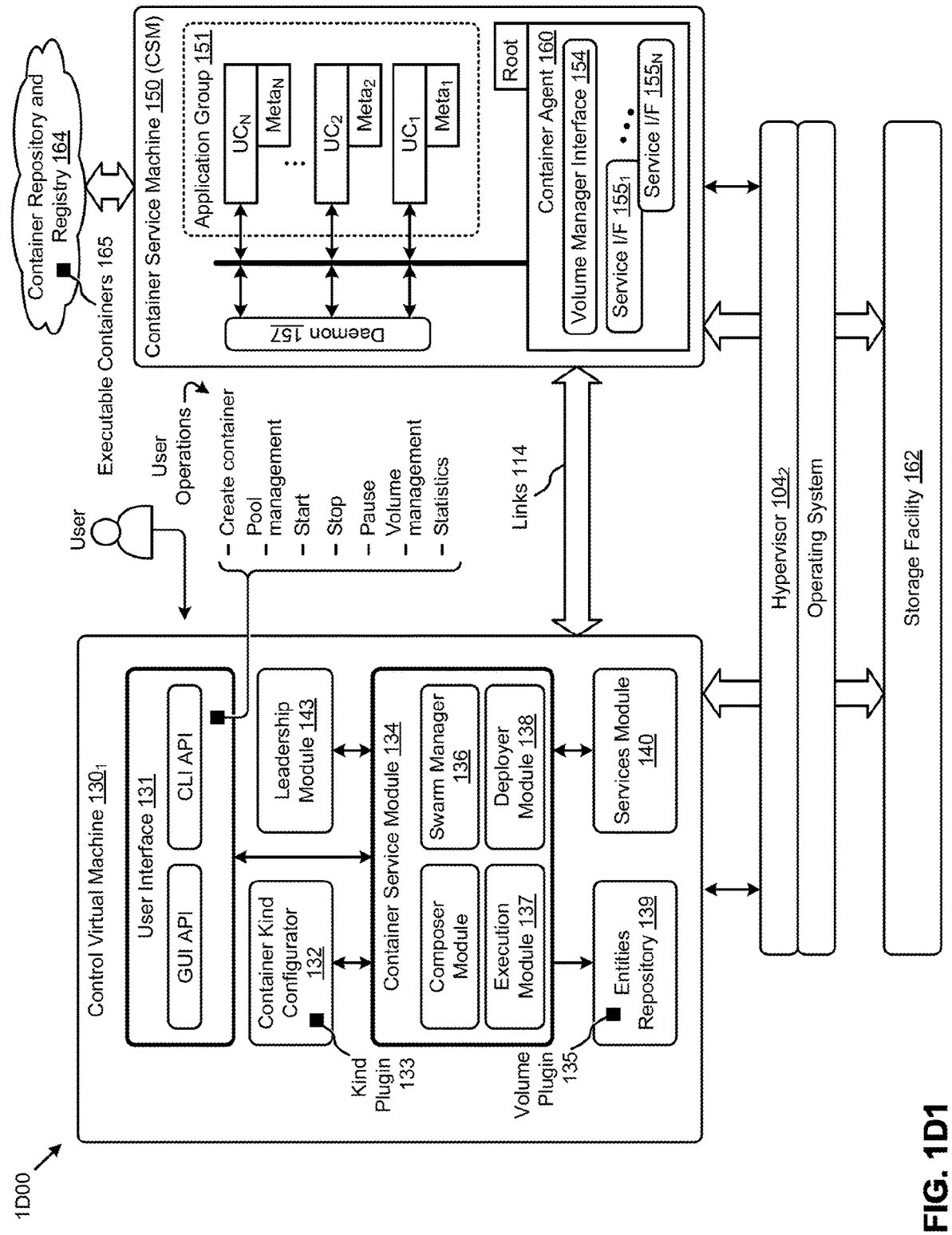
FIG. 1D1

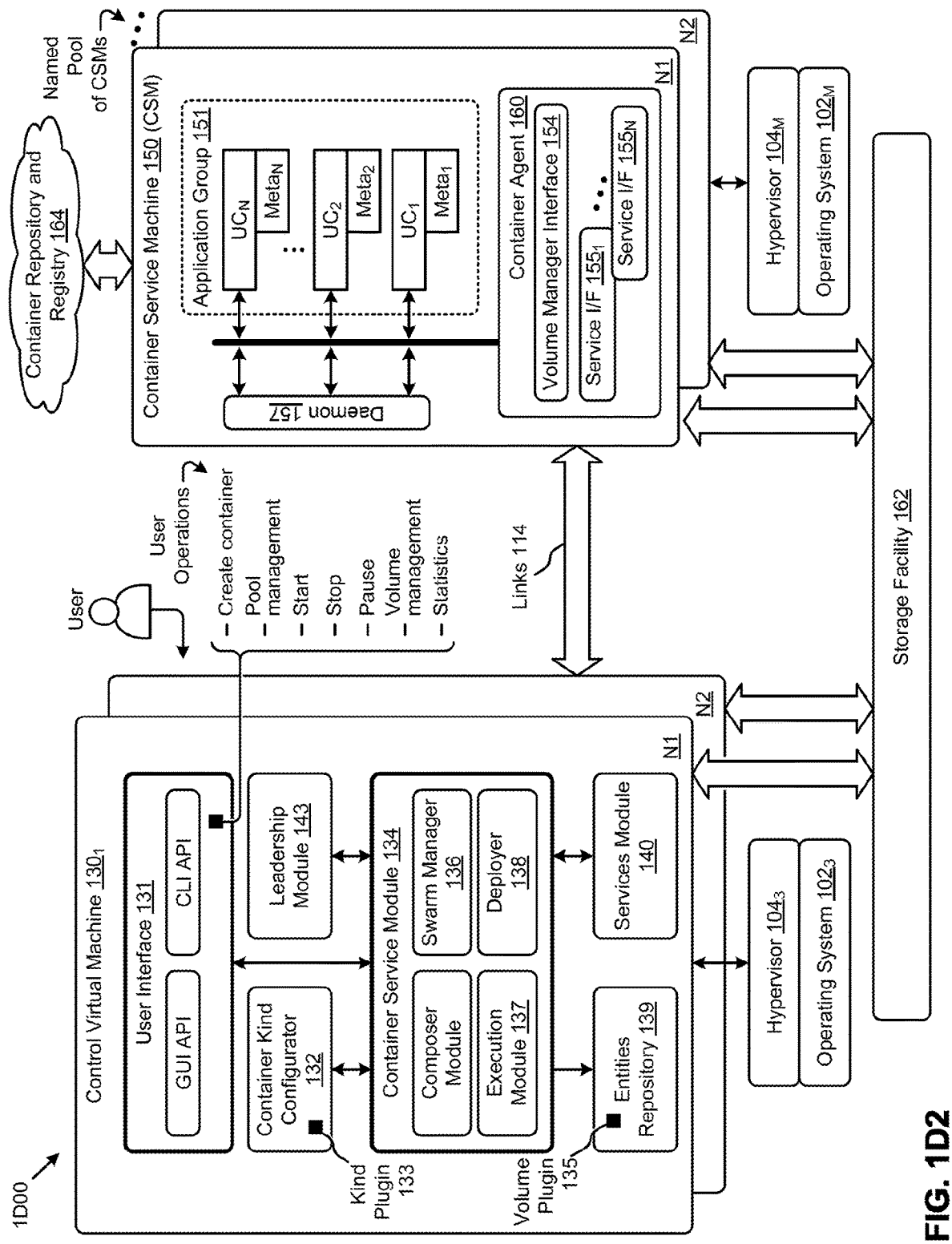
FIG. 1D2

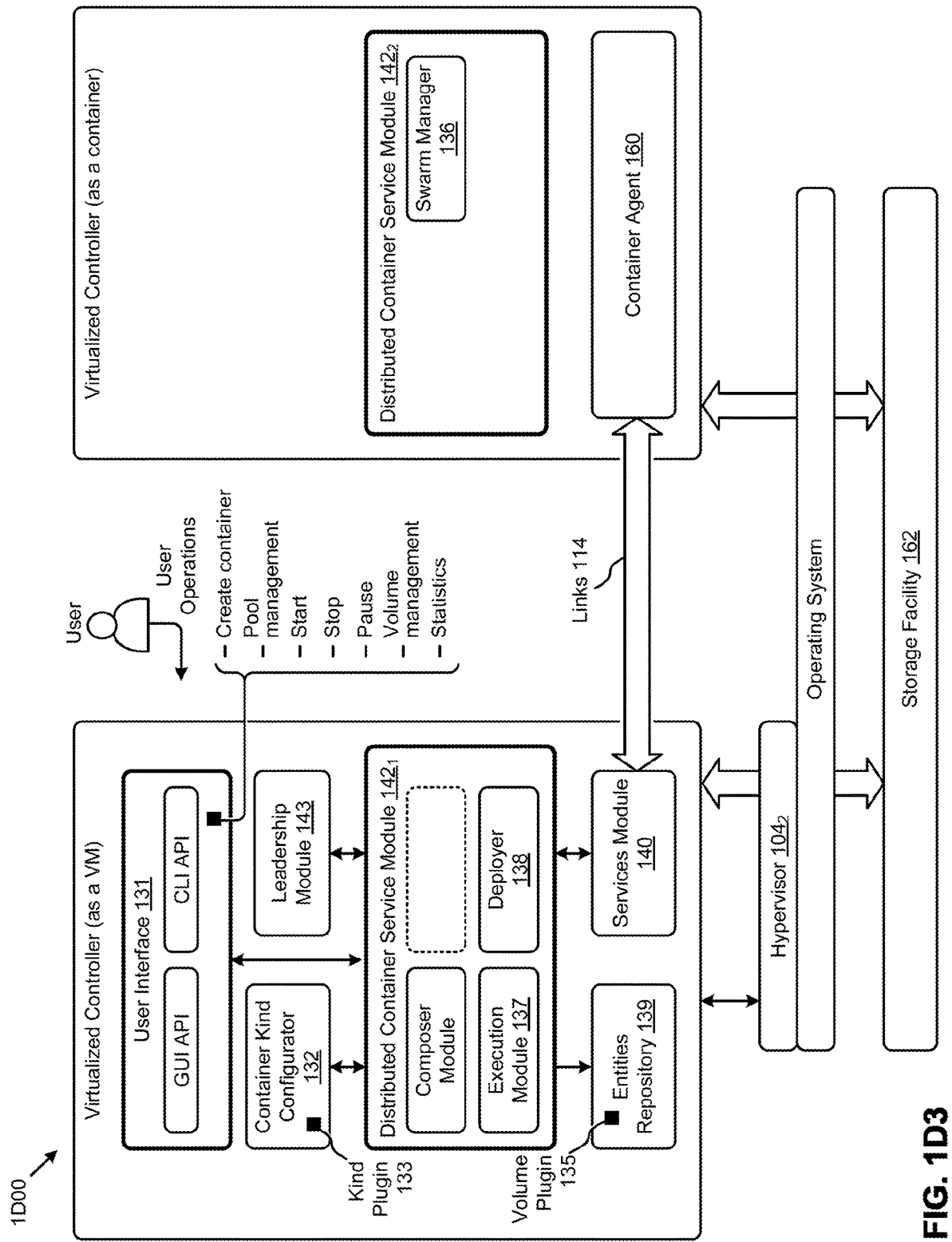
FIG. 1D3

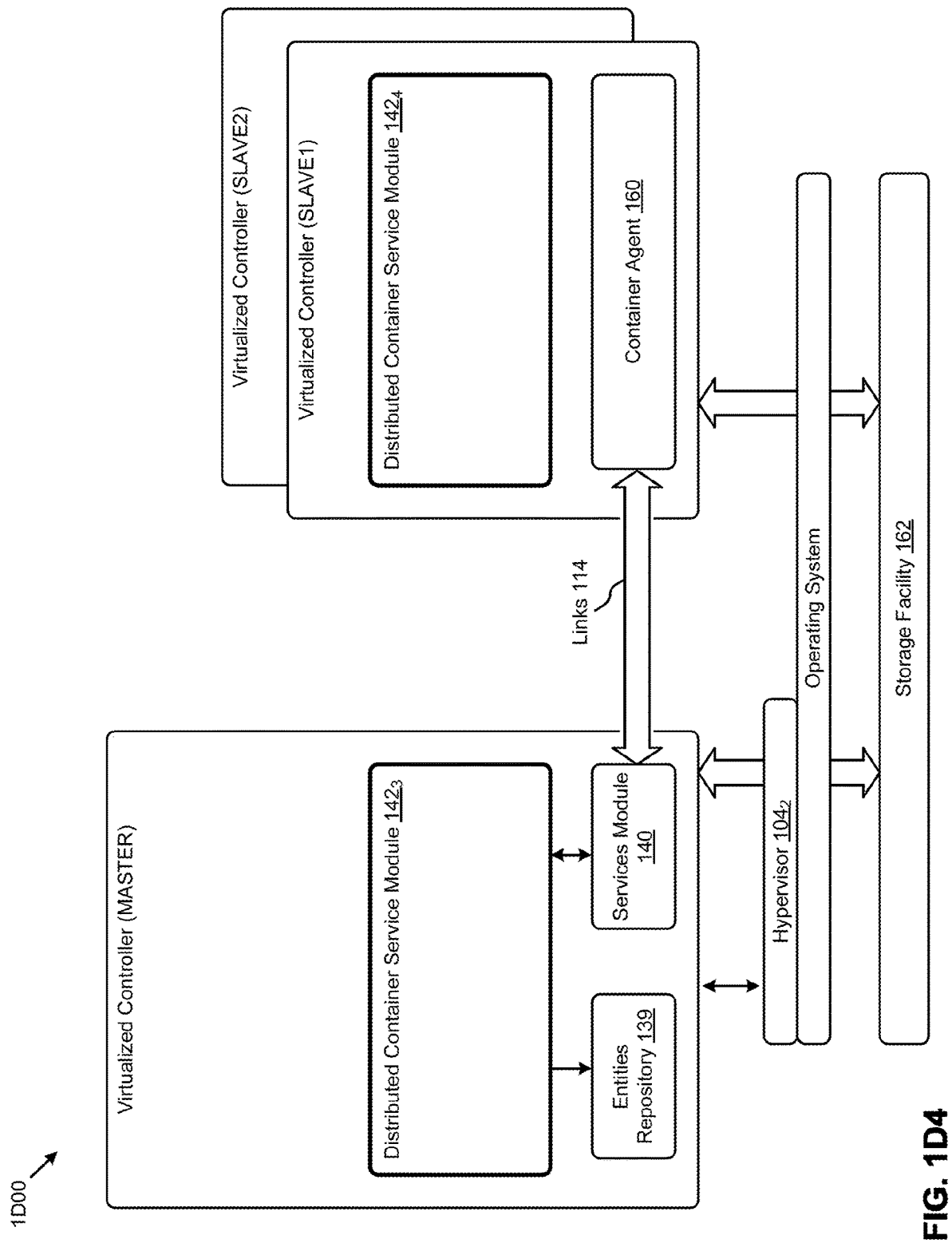
FIG. 1D4

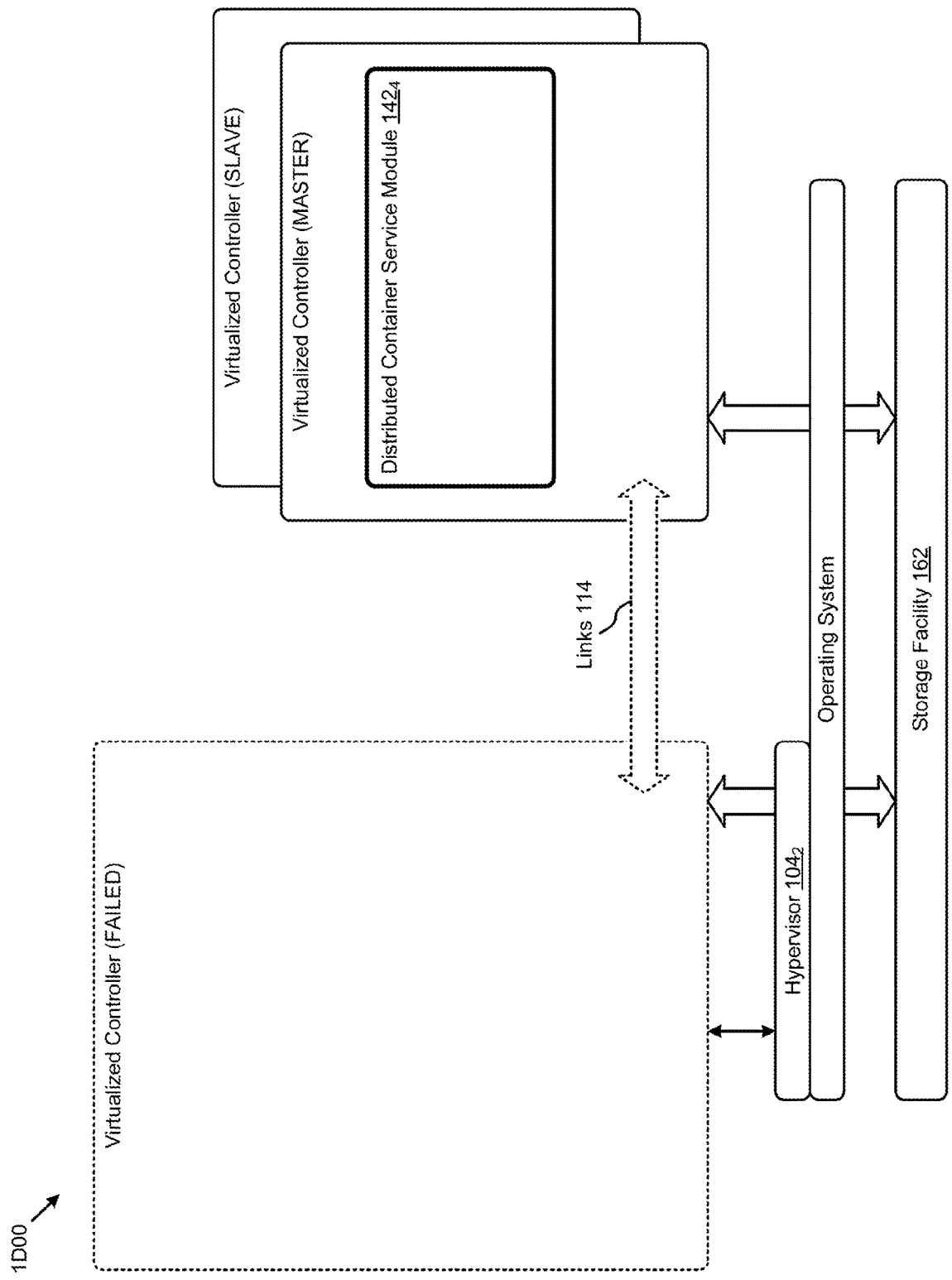
FIG. 1D5

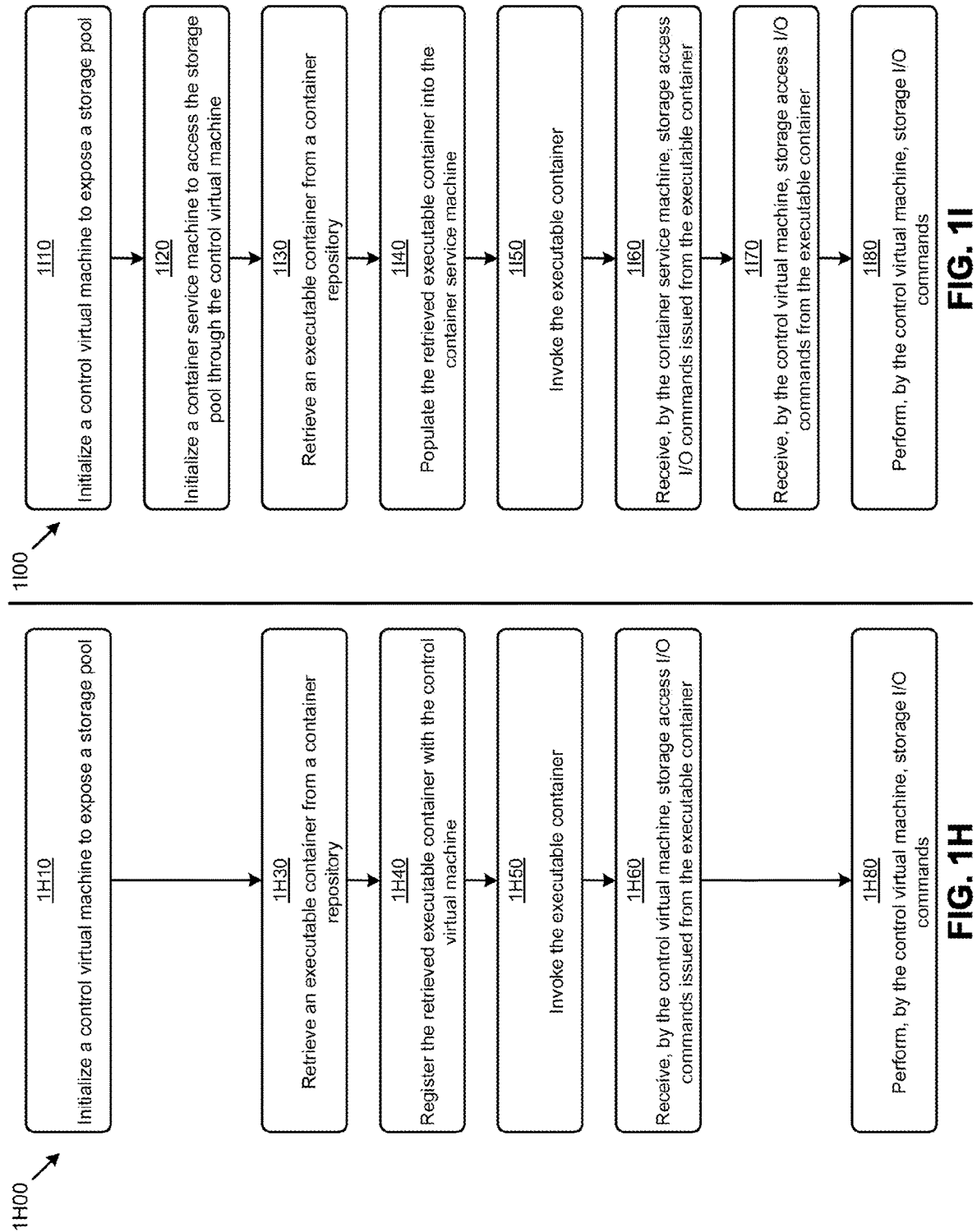

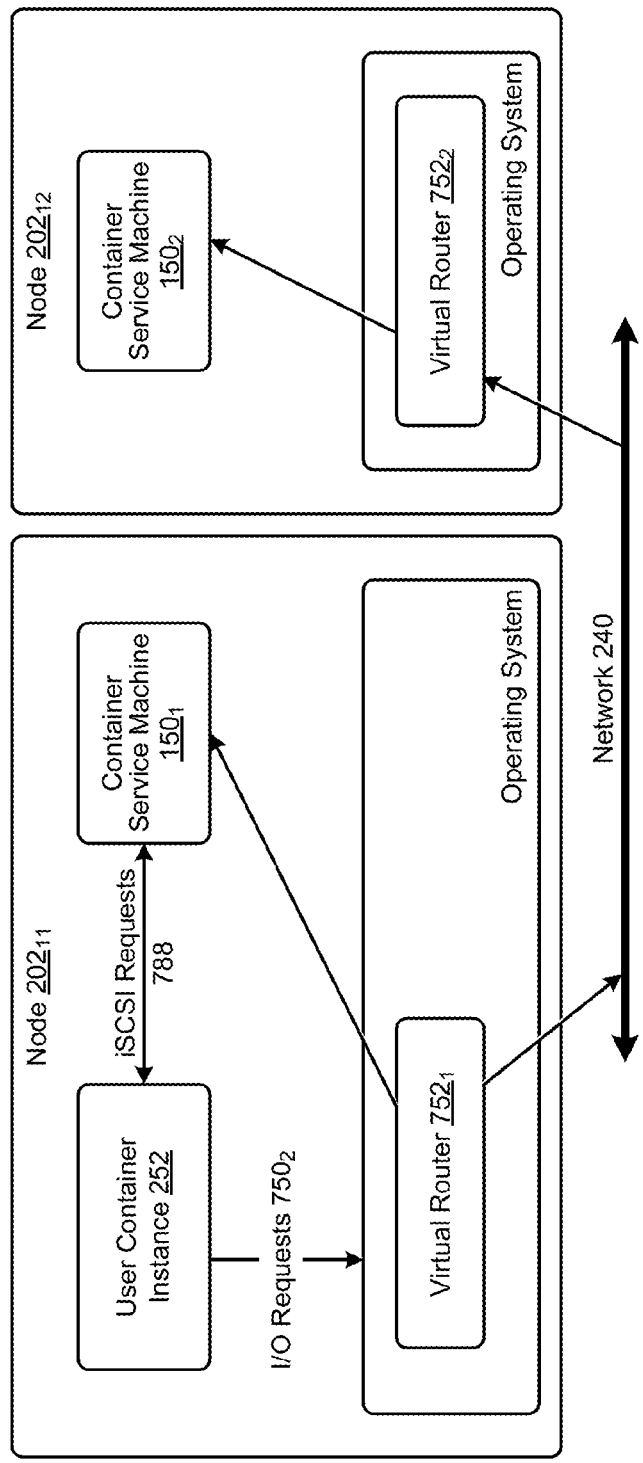
FIG. 7B1

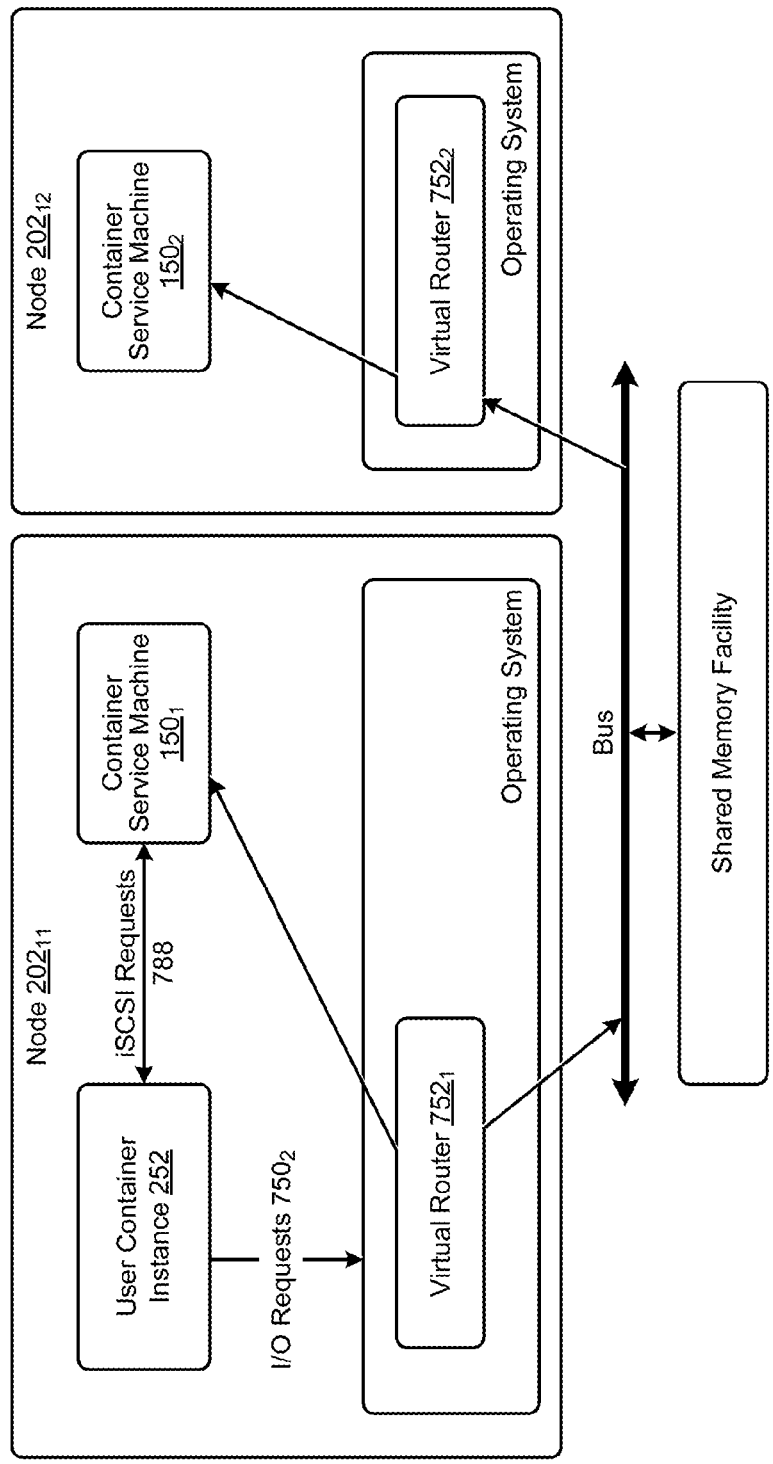
FIG. 7B2

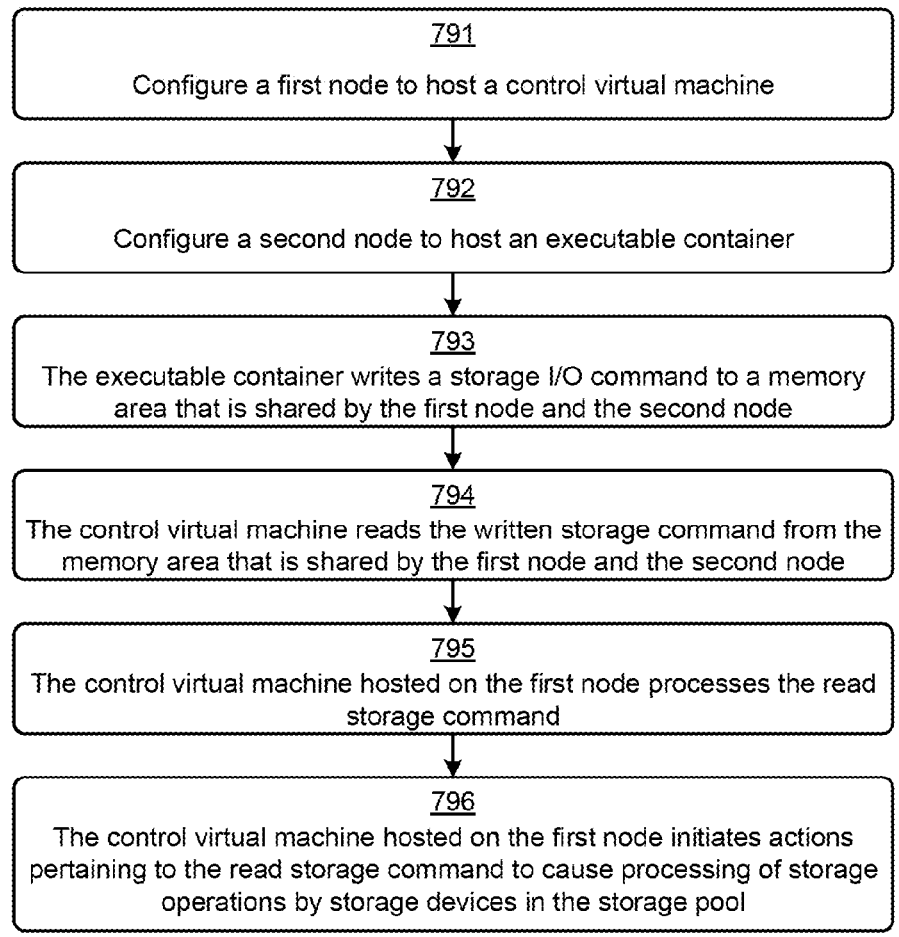
FIG. 7B3

ARCHITECTURE FOR MANAGING I/O AND STORAGE FOR A VIRTUALIZATION ENVIRONMENT USING EXECUTABLE CONTAINERS AND VIRTUAL MACHINES

RELATED APPLICATIONS

The present application is a continuation application of U.S. application Ser. No. 15/173,577 titled, "ARCHITECTURE FOR MANAGING I/O AND STORAGE FOR A VIRTUALIZATION ENVIRONMENT USING EXECUTABLE CONTAINERS AND VIRTUAL MACHINES", filed on Jun. 3, 2016, which claims the benefit of priority to U.S. Patent Application Ser. No. 62/171,990 titled, "ARCHITECTURE FOR MANAGING I/O AND STORAGE FOR A VIRTUALIZATION ENVIRONMENT USING CONTAINERS AND VIRTUAL MACHINES", filed Jun. 5, 2015, which are hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to high-performance computing and more particularly to techniques for managing executable containers in a virtualization environment.

BACKGROUND

The term "virtualization" has taken on many meanings in the domain of computers and operating systems as well as in storage and networking domains. Hardware (e.g., CPUs and peripherals) can be virtualized so as to "hide" the details of how to interface with the hardware from a user by adding a layer of software (e.g., an operating system). Likewise, an operating system can be virtualized so as to "hide" the details how to interface with the operating system by adding a layer of software (e.g., a hypervisor). Users can write code to perform some functions without a strong reliance on the underlying infrastructure such as a particular operating system and/or a particular vendor and/or a particular configuration of hardware.

Further, details pertaining to interfacing with underlying storage facilities and networking configurations can be abstracted by providing a specially configured "control" virtual machine (see below), and users can write code that runs in another "user" virtual machine. Such abstractions are a boon to code developers and system administrators alike, and very large virtualized systems comprising many hundreds or thousands of nodes and many hundreds or thousands (or millions) of user virtual machines can be configured and managed by an operator who interfaces with a configuration panel to configure said hundreds or thousands (or millions) of virtual machines.

In a virtualized system, it is sometimes convenient for a developer to deploy some set of functions using units called "containers". A container can be configured to implement a particular function without reliance of a fully-configured hardware and/or software platform. For example, a container might be defined to perform some simple operation over some inputs and produce an output. In such a case, the container might be very lightweight, requiring only a way to receive the inputs, a way to perform the simple operation, and a way to provide the output. The "weight" of a hypervisor and/or an operating system is unnecessary in this case. In some cases a container might be defined to provide a somewhat more complex service, in which case the developer of the container might choose to bring some small portion of an operating system or hypervisor into the container. In such a case, the resulting container can still be lightweight vis-à-vis the alternative of bringing in the entire operating system or hypervisor. In still more situations, a group of containers might be defined and developed in such a manner that the group of containers performs as an "application". This paradigm can be extended to include many hundreds or thousands (or millions) of containers.

Virtualization Using Virtual Machines

A "virtual machine" or a "VM" refers to a specific software-based implementation of a machine in a virtualization environment in which the hardware resources of a real computer (e.g., CPU, memory, etc.) are virtualized or transformed into the underlying support for the fully functional virtual machine that can run its own operating system and applications on the underlying physical resources just like a real computer. Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other.

Virtualization Using Container-Based Virtualization

Recently, container-based virtualization technologies have grown in popularity. In comparison to virtual machines, which mimic independent physical machines by creating a virtual machine that runs on top of a host's operating system, containers virtualize the applications that can run in user-space directly on an operating system's kernel. Applications, such as a web server or database that run from within a container, do not require an emulation layer or a hypervisor layer to interface with the physical machine. Instead, "containerized" applications can function using an operating system's normal system calls. In this way, containers provide operating system-level virtualization that is generally faster (e.g., faster to transport, faster to "boot" or load) than virtual machines because the containers do not require virtualized guest OSes.

One reason for the broad adoption of virtualization technologies such as virtual machines or containers is the resource advantages provided by the virtual architectures. Without virtualization, if a physical machine is limited to a single dedicated operating system, then during periods of inactivity by the dedicated operating system the physical machine is not used to perform useful work. This is wasteful and inefficient if there are users on other physical machines that are currently waiting for computing resources. In contrast, virtualization allows multiple virtualized computers (e.g., VMs, containers) to share the underlying physical resources so that during periods of inactivity by one virtualized computer, another virtualized computer can take advantage of the resource availability to process workloads. This can produce great efficiencies for the use of physical devices, and can result in reduced redundancies and better resource cost management.

Data centers are often architected as diskless computers ("application servers") that communicate with a set of networked storage appliances ("storage servers") via a network, such as a fiber channel or Ethernet network. A storage server exposes volumes that are mounted by the application servers for their storage needs. If the storage server is a block-based server, it exposes a set of volumes by logical unit numbers (LUNs). If, on the other hand, a storage server is file-based, it exposes a set of volumes called file systems.

While generally more lightweight than VMs, containers that are improperly secured can provide malicious access (e.g., root access) to a physical host computer running the containers. Further, container technologies currently do not provide a means for storage optimizations to occur in the primary storage path. Generally, containers are integrated directly with the operating system (OS) to work with the kernel using system calls. Optimizing storage for containers can require heavy OS customization. Compounding these issues and problems endemic to container technologies, deployment of containers in virtualized environments brings a raft of hitherto unaddressed problems.

Unfortunately, legacy techniques to integrate and control containers in a virtualized environment have fallen short. Indeed, although containers can be deployed and managed in rudimentary ways using legacy tools, such legacy tools fall far short of providing the comprehensive set of configuration, deployment, and publishing features that are demanded in hyper-converged platforms. What is needed is a way for one, or tens, or hundreds, or thousands, or millions of containers to be deployed and controlled in a virtualized environment.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for managing executable containers in virtualization environments, which techniques advance the relevant technologies to address technological issues with legacy approaches. More specifically, the present disclosure provides a detailed description of techniques used in systems, methods, and in computer program products for managing containers in a virtualization environment. Certain embodiments are directed to technological solutions for provide a deployment and configuration layer that interfaces with any number of containers.

The disclosed embodiments modify and improve over legacy approaches. In particular, the herein-disclosed techniques provide technical solutions that address the technical problems attendant to deploying, and managing large numbers of containers a hyper-converged virtualization environment. Such technical solutions serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A and FIG. 1B illustrate example virtualized computers as used for managing containers in a virtualization environment, according to some embodiments.

FIG. 1C illustrates an example container on bare metal.

FIG. 1D1, FIG. 1D2, FIG. 1D3, FIG. 1D4 and FIG. 1D5 depict block diagrams of a container support system used for configuring, deploying, and managing containers in a virtualization environment, according to an embodiment.

FIG. 1H and FIG. 1I present a flowcharts of storage pool use models, according to some embodiments.

FIG. 2 illustrates an example cluster architecture as used to implement I/O and storage device management in systems that support cluster-wide configuration of containers in a virtualization environment, according to an embodiment.

FIG. 3 depicts a single-node container service machine configuration, according to an embodiment.

FIG. 4 illustrates a one-container-service-machine-per-node architecture as used in systems that support cluster-wide configuration of containers in a virtualization environment, according to an embodiment.

FIG. 5 illustrates a one-control-virtual-machine-per-node architecture as used in systems that support cluster-wide configuration of containers in a virtualization environment, according to an embodiment.

FIG. 7A, FIG. 7B1, FIG. 7B2, FIG. 7B3 and FIG. 7C illustrate various inter-node communication techniques as used in systems that support configuring, deploying, and managing containers in a virtualization environment, according to an embodiment.

DETAILED DESCRIPTION

Figure 1E:
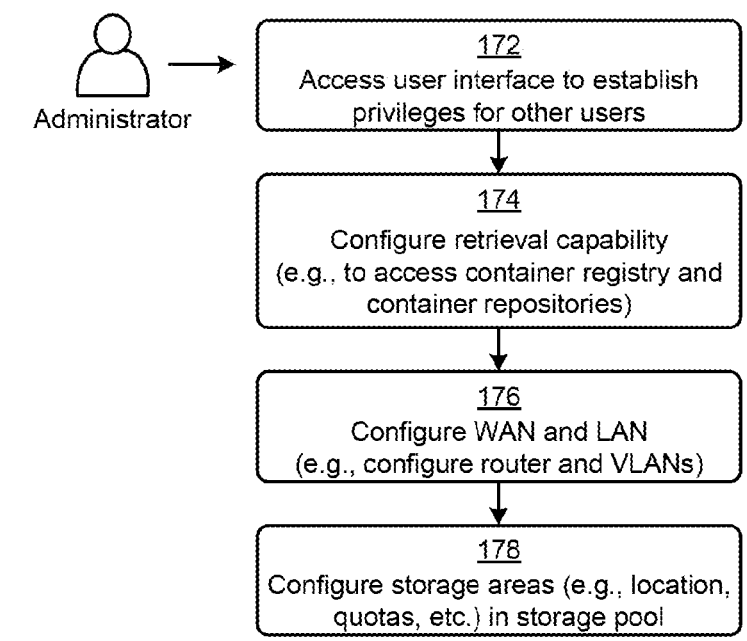
FIG. 1E presents a flowchart of an environment preparation technique as used by administrators in systems for configuring, deploying, and managing containers in a virtualization environment, according to an embodiment.

Some embodiments of the present disclosure address the problem of deploying, and managing large numbers of containers a hyper-converged virtualization environment and some embodiments are directed to approaches for provide a deployment and configuration layer that interfaces with any number of containers. The accompanying figures and discussions herein present example environments, systems, methods, and computer program products for managing containers in a virtualization environment.

Overview

Disclosed herein are systems and techniques that serve to integrate and control executable containers within a virtualized environment. The systems and techniques discussed hereunder disclose a comprehensive set of configuration, deployment, and publishing features that advance performance aspects and features of hyper-converged platforms.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A, FIG. 1B, FIG. 1C and FIG. 2 depict computing platform virtualization environments that support (1) virtual machine architectures, (2) executable container architectures and (3) various hereunder-described combinations of executable containers operating in cooperation with virtual machines. In many environments, executable containers comprise executable code that interfaces to resources of a hosting computing node. In some cases the executable code can be deployed as binary code, and/or as byte code, and/or as interpreted code. The code can interface to resources of a computing node without a hypervisor, and code can interface to the resources of a computing node without reliance on any particular operating system configuration. In still some other situations, the executable container can subsume portions of operating system code that interfaces to the resources of a computing node in a multi-processing mode, where the subsumed operating system code includes portions of an operating system code, such as an operating system kernel or portion thereof. Executable containers can provide computing services, possibly including entire applications, and can operate in many architectures, including virtual machine architectures.

The depictions of virtual machine architecture 100 (see FIG. 1A), container architecture 110 (see FIG. 1B), and "bare metal" architecture 112 (see FIG. 1C) show examples of how applications or services can be deployed within the various architectures. Applications or services can be configured to provide any functionality. For example, an application or service can implement a user-defined function, a middleware function, and/or can implement services that interact with the computing environment. Such computing environments can include multiple computing nodes, any of which communicate over network facilities. The multiple computing nodes can interact with storage facilities such as node-local storage as well as networked storage.

In many situations as disclosed herein, executable containers operate in cooperation with virtual machines. In some cases the executable containers might need access to the same or similar storage facilities as are accessed by the virtual machines.

Figure 2:
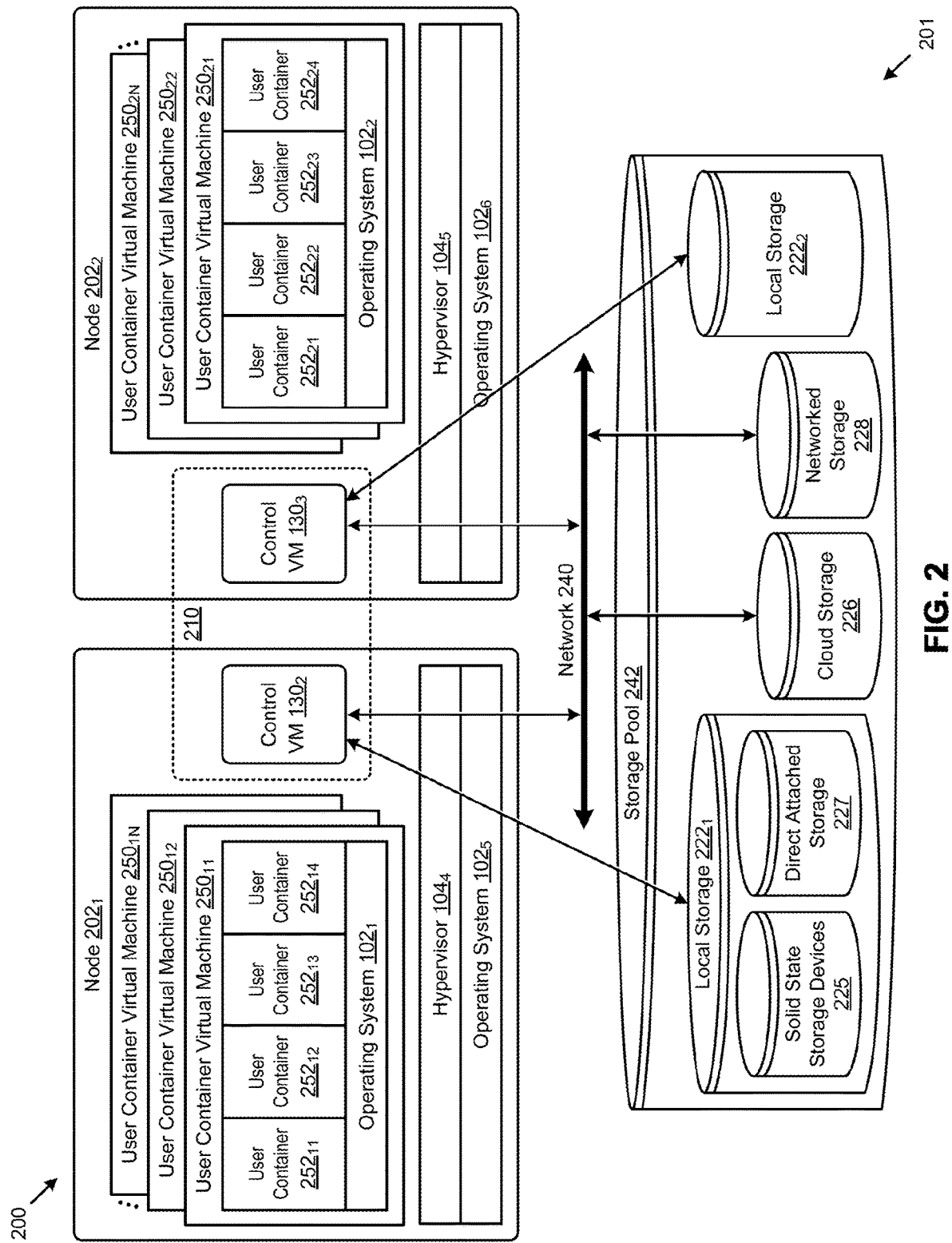

Described herein are architectures, configurations, and techniques for implementing storage management over shared storage facilities. More specifically, FIG. 2 illustrates an architecture for implementing storage management in a clustered virtualization environment. The example cluster architecture 200 depicts a multi-node cluster 201 having two nodes that share a common storage pool. The architecture of FIG. 2 can implement a distributed platform that contains nodes in the form of servers (e.g., shown as node $202_1$ and node $202_2$) that manage multiple tiers of storage in the storage pool 242. The multiple tiers of storage includes storage that is accessible through a network 240, such as cloud storage 226 or networked storage 228 (e.g., a SAN or storage area network). Additionally, the present embodiment also permits local storage $222_1$ and local storage $222_2$ that is within or directly attached to the server and/or appliance to be managed as part of the storage pool 242 that is shared by a plurality of nodes of the cluster. Examples of such storage include solid-state drives (e.g., solid-state storage devices 225) or spindle drives (e.g., direct attached storage 227), etc. These collected storage devices, both local and networked, form a storage pool 242. Virtual disks (vDisks) can be structured from the storage devices in the storage pool 242, as described in more detail below. As used herein, the term vDisk refers to the storage abstraction that is exposed by a control VM to be used by a user VM. In some embodiments, the vDisk is exposed via an internet small computer system interface (iSCSI) or a network file system (NFS) and is mounted as a virtual disk on the user VM.

As depicted, each server runs virtualization software such as VMware ESXi, Microsoft Hyper-V, or RedHat KVM, etc. The virtualization software includes a hypervisor (e.g., hypervisor $104_4$, hypervisor $104_5$) running atop an operating system (e.g., operating system $102_5$, operating system $102_6$) to manage the interactions between the underlying hardware and the one or more container service machines that run client software.

The one or more instances of a container service machine 150 (e.g., instances shown as user container virtual machine $250_{11}$, user container virtual machine $250_{12}$, . . . , user container virtual machine $250_{1N}$) may be implemented as a virtual machine with an operating system $102_1$ that supports containers (e.g., Linux). As such, one or more user containers (e.g., user container $252_{11}$, user container $252_{12}$, user container $252_{13}$, user container $252_{14}$) may run from within its respective user container virtual machine. Each of the user containers may comprise one or more images that are layered to appear as a single file system for that container. For example, a base layer may correspond to a Linux Ubuntu image, with an application execution layer on top. The application execution layer corresponding to a read/write execution environment for applications, such as MySQL or websites, is explained further below.

A different node configuration shown as node $202_2$ can access the same storage pool 242, even though the node is configured differently from node $202_1$. As shown, the node $202_2$ comprises one or more instances of a container virtual machine (e.g., instances shown as user container virtual machine $250_{21}$, user container virtual machine $250_{22}$, . . . , user container virtual machine $250_{2N}$) which may be implemented as a virtual machine with an operating system $102_2$ that supports containers. As such, one or more user containers (e.g., user container $252_{21}$, user container $252_{22}$, user container $252_{23}$, user container $252_{24}$) may run from within it respective user container virtual machine.

In some embodiments, special service-virtualized computers, here illustrated as control virtual machine $130_2$ and control virtual machine $130_3$, are used to manage storage and I/O activities for the user containers. The control virtual machine serves as a "storage controller" in the currently described architecture. Multiple such storage controllers coordinate within a cluster to form a single system. The control virtual machines are not formed as part of specific implementations of hypervisors. Instead, the control virtual machines run as virtual machines above respective hypervisors on the various shown nodes, and work together to form a distributed system 210 that manages all the storage resources, including the locally attached storage (e.g., local storage $222_1$, and local storage $222_2$) as well as the networked storage 228 and the cloud storage 226. Since the control VMs run above the hypervisor, this means that the current approach can be used and implemented within any virtualized computer architecture since the control VMs of embodiments of the invention can be used in conjunction with any hypervisor from any virtualization vendor.

Each control VM exports one or more block devices or NFS server targets that appear as disks to the user containers. These disks are virtual, since they are implemented by software running inside the control VMs. Thus, to a user container, the control VMs appear to be exporting a clustered storage appliance that contains some disks. Also, all user data (including the operating system) in the container service machines resides on these virtual disks.

Significant performance advantages can be gained by allowing the virtualization system to access and use local, server-internal storage. This is because I/O performance is typically much faster when performing access to local storage as compared to performing access to networked storage 228 across a network 240. This faster performance for locally attached storage can be increased even further by using certain types of optimized local storage devices, such as SSDs 225, as shown.

Once the virtualization system is configured so as to be capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage. On the other hand, data that does not require fast access or which is accessed infrequently can be stored in the networked storage devices or in cloud storage 226.

Further details regarding approaches for implementing storage management within virtualization environments are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Virtualization environments include computers that execute computer code, the execution of which can emulate or abstract hardware and/or software components for access through one or more abstraction layers. Abstraction layers can take many forms, possibly including hypervisors, application programming interfaces (APIs), libraries, containers, middleware components, etc. Applications and services can access the emulated or abstracted hardware and/or software components through the abstraction layer. In some cases entire computer settings are abstracted so as to isolate the aforementioned applications or services from the details of the virtualized hardware and/or software components. Several approaches for virtualized computing are now briefly discussed as example approaches. Some approaches include virtual machines, some approaches include executable containers, and some approaches include combinations thereof.

Specifically FIG. 1A and FIG. 1B illustrate approaches for implementing virtualized computing machines using virtual machines (FIG. 1A) and containers (FIG. 1B). In FIG. 1A, a virtual machine architecture 100 is illustrated comprising hardware $101_1$ which includes the physical hardware of a computer such as a processor and memory. An operating system $102_1$ may be installed on the hardware $101_1$. Further, a hypervisor $104_1$ may be installed on the operating system to instantiate and manage one or more virtual machines (e.g., virtual machine $106_1$ and virtual machine $106_2$). Though FIG. 1A shows the hypervisor $104_1$ installed on the operating system $102_1$, in some embodiments a hypervisor $104_1$ may be installed and function directly from the hardware level (e.g., running on "bare metal").

The virtual machine $106_1$ and virtual machine $106_2$ may each have operating systems installed within them (not depicted), such as Microsoft Windows or Linux. The virtual machines may have allocated memory and processor resources from the hardware level. The virtual machines may be used to run one or more applications, such as application $108_1$ and application $108_2$.

Though one application per virtual machine is illustrated in FIG. 1A, one of ordinary skill in the art appreciates that each virtual machine (e.g., virtual machine $106_1$, and virtual machine $106_2$) may run a plurality of applications in their respective virtualized computing environment. While virtual machines provide effective computer security and flexibility in provisioning resources, in some implementations they may be unwieldy because a hypervisor layer must still be installed onto the operating system. Further, each virtual machine might require a full operating system, a substantial amount of disk-space, and might consume a significant portion of processor computing power as well as a substantial amount of memory.

FIG. 1B illustrates an alternative approach for virtualized computing environments using containers. There, container architecture 110 comprises a hardware $101_2$ comprising physical hardware, such as one or more processors (e.g., processor cores) and memory. An operating system $102_2$ is installed on the hardware $101_2$. The operating system $102_2$ is configured to support containers using container support frameworks such as Linux containers (e.g., LXC) and Docker (e.g., dockerized containers). Docker is company that provides products (e.g., Docker) for deployment of code (e.g., services, applications) within a container execution environment.

As illustrated, the operating system can host and support or manage one or more containers, such as container $116_1$ and container $116_2$. The containers may implement one or more applications as containerized applications, such as application $108_3$ and application $108_4$. Notably, containerized applications can run directly from the operating system in a container without a hypervisor layer or dedicated memory, disk space, or processors. This containerized approach allows containers to be relatively lightweight as each application can run without a full virtual machine (VM) running. Although only one application is illustrated per container (e.g., application $108_3$ running from container $116_1$), one of ordinary skill in the art can appreciate that, in some implementations, multiple applications may be run from each container. For example, in container implementations using Docker, only one application per container may be implemented, while container applications using Linux containers or LXC, a plurality of applications may run from each container.

FIG. 1C illustrates an example container on bare metal. As an option, one or more variations of example container or any aspect thereof may be implemented in the context of the architecture and functionality of the embodiments described herein. The example container or any aspect thereof may be implemented in any environment.

The embodiment shown in FIG. 1C is merely one example. As shown, the bare metal architecture 112 comprises one or more containers (e.g., container $116_3$ and container $116_4$) each of which comprise a selection of operating system modules that run on the hardware $101_3$.

Containers deployed in such an architecture can be extremely lightweight, possibly involving a pod technology that federates common code blocks so only one copy of the module is needed even when multiple containers uses the same code block. This architecture as shown is void of support for ongoing management of the deployed containers.

FIG. 1D1 and FIG. 1D2 depict block diagrams of a container support system 1D00 used for configuring, deploying, and managing containers in a virtualization environment. As an option, one or more variations of container support system 1D00 or any aspect thereof may be implemented in the context of the architecture and functionality of the embodiments described herein. The container support system 1D00 or any variation or aspect thereof may be implemented in any environment.

High-Level Components

As shown a control virtual machine $130_1$ (CVM) includes a user interface 131 (UI) that provides a man-machine interface that can comprise a graphical user interface and/or a GUI API as well as a command line style interface with a CLI API. Either or both of the interfaces can be employed by a user to schedule or carry out a set of user operations. More particularly, the user interface 131 permits a user to interact with various modules of the container support system so as to configure, deploy, and publish containers in a hyper-converged environment. A virtualized controller (e.g., control virtual machine $130_1$) includes components that can communicate with components of a container service virtual machine (e.g., container service machine 150). In some embodiments and as shown, a control virtual machine $130_1$ communicates with a container service machine 150 (CSM) over one or more links 114. Such communication can be facilitated by a services module 140 and a container agent 160. A container service virtual machine runs on top of a hypervisor and hosts a user container to provide services (e.g., storage I/O (input/output or IO) services) to the user container. In many cases a user container is preconfigured (e.g., within a Docker repository) with file system components that are intended for use with a particular (e.g., CIFS, NFS, other standard) file system. However in the context of a hyper-converged clustered environment where both local storage (e.g., node-local storage) and networked storage devices (e.g., shared remote storage) are combined into a storage pool (e.g., storage facility 162), the additional capabilities of a control virtual machine are needed.

Returning to the discussion of the UI, the nature and content of the interactions and communications depend at least in part on the intent of the user as indicated by the user's submission of user operations via the UI. Strictly as examples, the foregoing components operate in coordination so as to facilitate container configuration and management operations such as "create container", "start" a container, "stop" a container, and "pause" a container. Other examples might involve configuration and management of the environment in which the containers operate. As an example, the foregoing components operate in coordination so as to facilitate storage pool management, volume management, as well as to facilitate capture and reporting of statistics, etc. Any component or components within the container support system might be tasked or partitioned so as to participate in configuration of the container service machine and/or the containers that run within the container service machine. As can be observed, when a user container (e.g., $UC_1$, $UC_2, \ldots, UC_N$) runs within a container service machine, it can access facilities beyond the bare metal. More particularly, containers that run within a container service machine have access to all of the services available to a user virtual machine, plus additional services as may be provided by a hypervisor (e.g., hypervisor $104_2$) and/or an underlying operating system. The operating system underlying the container service machine 150 might be different from the operating system or operating system components that might be included in a user container (e.g., $UC_1, UC_2, \ldots, UC_N$).

In some cases, a container service machine 150 might include a volume manager interface 154 and/or any number of service interfaces (e.g., service interface $155_1, \ldots,$ service interface $155_N$), which service interfaces might include access to services pertaining to a network manager or other service interfaces. Such interfaces provide system functions (e.g., configuration and I/O) to user containers that access cluster facilities (e.g., storage facilities, and/or load balancing facilities and/or network facilities or other cluster facilities). A volume manager interface 154 and/or the service interfaces can be separately implemented, or can be implemented in one module, or can be subsumed by another module within the container service machine 150. A network manager can provide networking services that serve to "harden" the container service machine against malicious activities, and/or that serve to protect the container service machine from accessing container repositories that are known or become known to contain malicious code.

In some cases, and as shown in FIG. 1D1, a container service machine 150 might run in a one-to-one deployment (e.g., one-container service machine to a node). In other cases, and as is shown in FIG. 1D2, a first container service machine might run on node N1, and a second container service machine might run on node N2, and so on for up to N nodes. In a cluster setting one of the container service machines might be designated as a cluster master container service machine. Functions pertaining to a cluster master container service machine are discussed hereunder.

Returning to the discussion of the shown control virtual machine $130_1$, in addition to the aforementioned configuration and control functions pertaining to user containers, the control virtual machine $130_1$ includes functionality to populate one or more container service machines with preconfigured executable containers 165 that are retrieved from a container repository and registry 164. A set of user containers might be selected, and downloaded, and configured individually and collectively into an application group 151. The set of user containers in application group 151 can be configured individually and/or collectively so as to function as a group, possibly to carry out a serializable series of operations (e.g., as a pipeline of operations), and/or to carry out a series of parallelizable or partially parallelizable operations (e.g., a fork-join operation). The aforementioned container agent can perform configuration and other operations autonomously, or in conjunction with the control virtual machine.

More particularly, the control virtual machine $130_1$, and/or the container service machine 150 can facilitate downloading of containers from a container repository and registry 164. Configuration of a set of containers might involve (1) parameterization and/or instantiation of a container into a CSM, (2) managing some or all of a set of containers as a swarm, (3) deployment of containers onto specific nodes, and/or (4) invocation of a set of containers, possibly in a particular sequence, and possibly involving election of a leader from among the set. As such, a control virtual machine in this environment might include modules in the form of a composer module (e.g., to perform parameterization and/or instantiation of a container into a CSM, possibly including deploying a set of containers working together as an application), a swarm manager 136 (e.g., to subsume and manage some or all of a set of containers as a swarm), a deployer module 138 (e.g., to map containers onto specific nodes), and an execution module 137 (to invoke a container according to a defined invocation regime).

Any or all of the aforementioned modules can be partitioned into a container service module 134. Any functions needed by the containers being hosted in the container service machine can be availed by a separate instance of leadership module 143 and/or a separate instance of service module 140, which modules can also serve to facilitate communication (e.g., over a link such as link 114) between any modules of the control virtual machine $130_1$ and any modules of the container service machine 150. The link and its endpoints can be operating system and hypervisor agnostic. In the example shown, the operating system $102_3$ as well as its corresponding hypervisor $104_3$ can be different from the operating system $102_M$ and its corresponding instantiation of hypervisor $104_M$.

In some cases, a particular container conforms to a particular set of rules or types. A type might be characterized by one or more "kinds", and a kind might correspond to a respective set of configuration parameters and/or configuration sequences. Any one or more distinct sets of configuration parameters and/or configuration sequences can be codified into a kind plugin 133, which plugin facilitates configuration of any instances of a particular type of container. Strictly as one example, a particular kind plugin might be used to configure a local area network or wide area network that is present or accessible in the environment. A kind plugin is merely one from among a large set of entities that can be accessed from an entities repository 139, which in turn can be accessed and configured (e.g., by a container kind configurator) for use by any container. One example of and use for an entity might include a specific configuration description (e.g., a template) that can be used in turn to characterize aspects of an environment under which a subject container might run. Different application can be associated with different templates that suit a particular deployment, such as might pertain to an a priori known application (e.g., a compute-intensive application, or a memory-intensive application, etc.). In some cases, such templates are labeled and exposed as pertaining to a "small" configuration or a "large" configuration. The configuration can be specific to an a priori known application, and can be specific regarding partitioning and/or mapping to the cluster resources. For example, a configuration can specify a rule or grammar of the form "<operand><operator><operand>", such as "<operand=application_name><uses><operand=configuration_name>", or "<operand=application_name><uses><operand=API_name>", or such as "<operand=application_name><uses><operand=configuration_name>", or such as"<operand=application_name><deploys onto><operand=Node_ID>". The foregoing are merely examples; other rule formats and/or grammars and/or operands and/or operators are envisioned. Another example of and use for an entity might include a file layout or a vDisk specification that can be used by a container.

A CSM (e.g., container service machine 150) might be preconfigurable for some specific purpose or purposes. For example, a CSM can be preconfigured with to run with specific access privileges and/or preconfigured to run with a particular set of hardware resources or quotas, or with any configurable or parameterizable characteristic.

User Interfaces

Strictly as examples, the user interface 131 can employ a GUI and/or a CLI to perform the following operations:

- Any forms of create, replace, update, or delete operations (CRUD) operations for a named container service machine.
- CRUD operations for creating a named pool of container service machines (see FIG. 1D2).
- Deploying a named container on a named container service machine or within a named pool of container service machines.
- Stop/Start/Pause/Remove operations on a container using a container ID.
- Operations to create container volumes in persistent storage.
- An operation to collect and report statistics pertaining to a specific container or pertaining to a particular container service machine, or from one or more container machine pools.
- Operations to specify one or more container registries and/or container repositories (e.g., to "docker hub").

Any of the above operations can be entered via a GUI or via a CLI, or both. In some cases, certain operations (e.g., create a docker container) can be performed using a "docker CLI". Moreover, a GUI or a CLI, or both can be configured to allow an authorized user to run the docker CLI remotely on a specific container machine. In some cases a set of private/public key pairs are used for authentication and/or authorization.

Container Service Module in the Control Virtual Machine

An instance of a control virtual machine $130_1$ runs on each node. As shown, the control virtual machine $130_1$ comprises several modules that are dedicated to managing containers. One such module is depicted as the container service module.

The functions of this module include functions of (1) a swarm manager; (2) operations to access "hub.docker.com" and other container communities; (3) a master container service, which in turn facilitates definitions for the container kind configurator 132; (4) creating details of the containers in the entity repository 139; (5) instantiating a container within one or more of the container service machines, and so on.

In one scenario, a user simply indicates their intent to deploy a particular container. The decision as to which particular container service machine in the container service machine pool container is to be deployed to is performed by the container service module 134, possibly in conjunction with internal modules (e.g., the swarm manager) and/or external modules (e.g., the shown services module 140). In addition to the aforementioned functions, the services module 140 facilitates network configuration, volume management, and lifecycle management of any container service machine. Additionally instances of a container service machine 150 can register a container with a leadership module 143 so as to bring the container into a group for leadership election.

Communications between the control virtual machine $130_1$ and the container service machine 150 can occur over the shown link 114. In many cases, communication into and out of the container service machine 150 can be performed by the shown container agent 160. The link can be implemented using any known communication techniques or modes. Strictly as an example, such a link can rely on inter-process communications (IPC), data message passing through shared memory, IP protocols, tunnels, etc.

Persistent Storage Facilities for Containers

Certain container architectures do not natively support persistent storage. Given this architecture, if a container is moved from one location (e.g., node) to another location (e.g., another node) a facility needs to move its storage with it. Various types of plugins (e.g., volume plugin 135) can be stored in, and retrieved from, the entities repository 139. Such volume plugins provide container deployments to be integrated with various persistent storage systems. Such integration using volume plugins support data volumes that persist beyond the lifetime of a single container and/or its container service machine host. Some containers support use of user defined volume names for associating container data with some external persistent storage volume. Such a persistent storage facility results in a stateful container that can be moved from one server to another while retaining at least portions of its state.

In some cases, a volume plugin 135 interacts with and/or is implemented by a daemon 157 that resides on the container service machine. Various daemon functions can be facilitated by and/or be included within the container agent 160, or elsewhere. A daemon can have a strong or weak affinity with an application group 151 and/or with any user container. Such a daemon can create named mount points for external volumes based on instructions from a container that has an affinity to the particular instance of a daemon 157. In some cases the aforementioned volume plugin receives a callback whenever a named volume is created. Further, the daemon can handle mounting and unmounting of a volume or volume group from a container.

In one scenario, the daemon calls into the volume plugin when a volume is to be mounted or unmounted. The volume plugin forwards the mount or unmount request to the container agent 160 which will attach the volume or volume group to the parent VM. The daemon can also initiate and/or perform steps pertaining to deleting the named volume.

Figure 3:
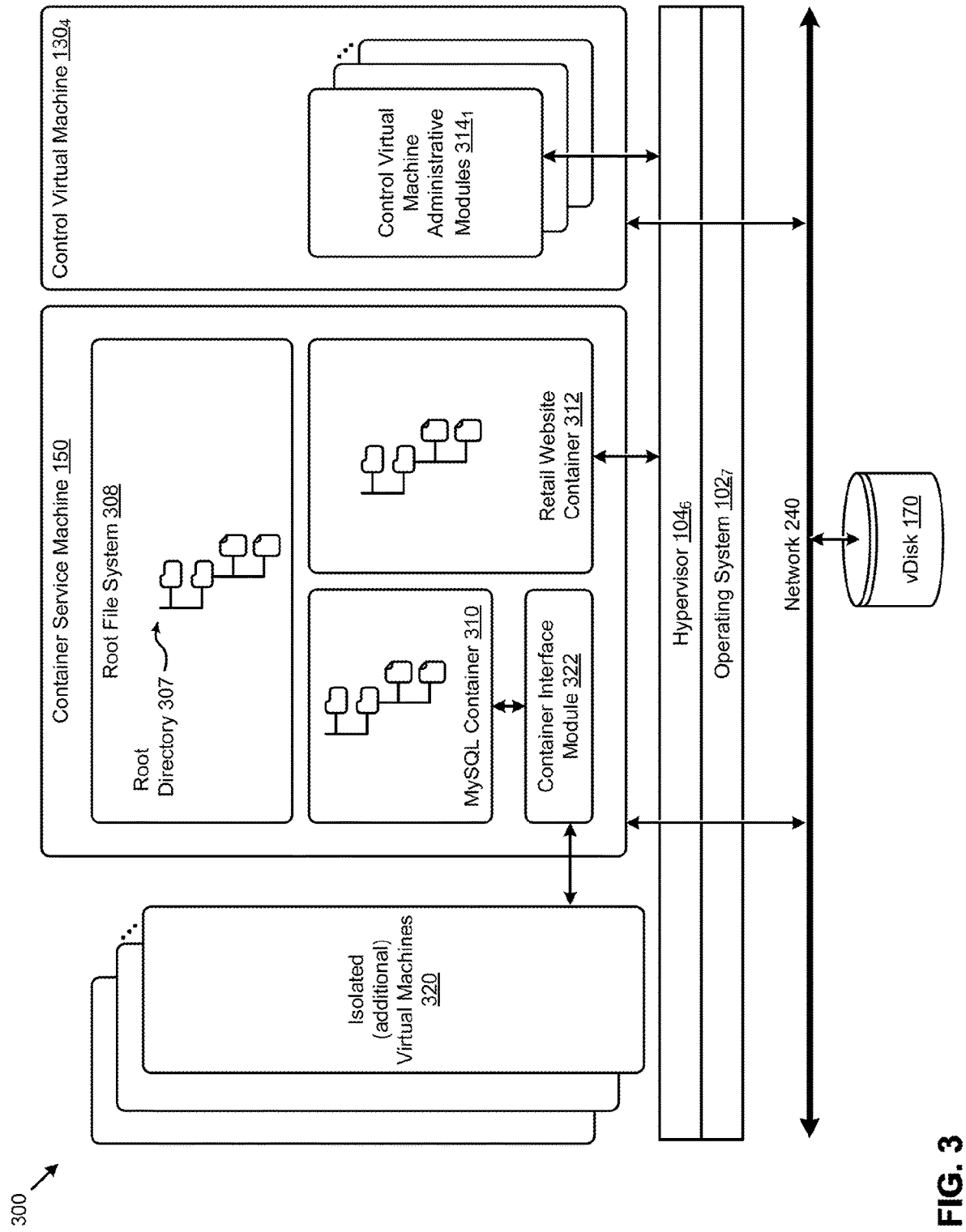

FIG. 1D3 depicts a block diagrams of a container support system 1D00 where portions of the virtualized controller are implemented in a distributed fashion. As shown, some functions within the distributed container service module $142_1$ can be implemented within a VM and some functions within the distributed container service module $142_1$ can be implemented within a container. Any functions can be distributed across either the VM or the container (e.g., storage functions to be performed over or by the storage devices within the storage facility 162). The shown embodiment depicts the situation where the swarm manager 136 (see swarm manager within the containerized distributed container service module $142_2$) that was formerly a module within the VM (see dotted line module). The relocated swarm manager 136 can fulfill all of the functions of a swarm manager even when the swarm manager is operating within the containerized distributed container service module $142_2$.

Figure 4:
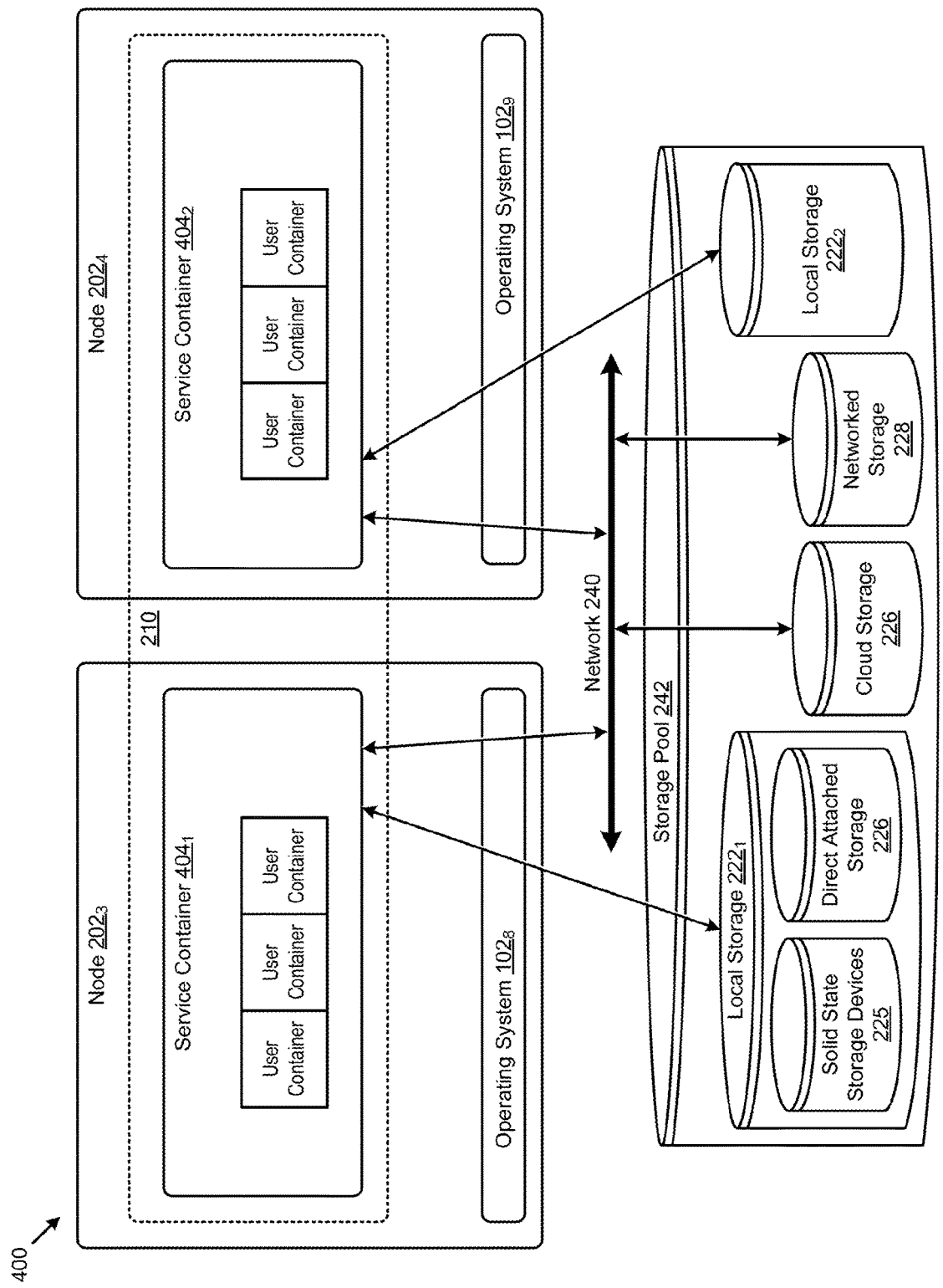
Figure 5:
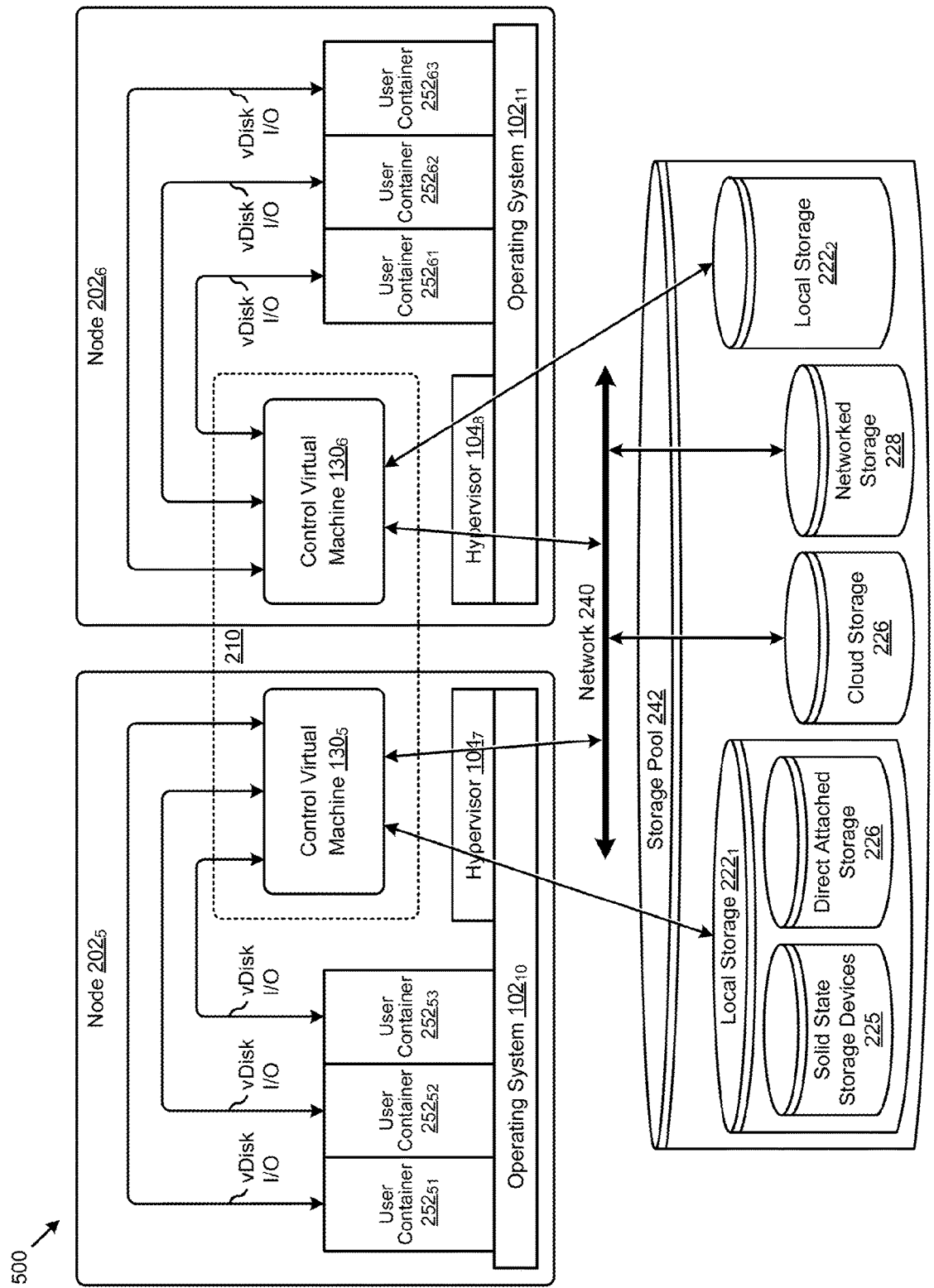

In some cases, such as is depicted in FIG. 1D4, any virtualized container can comprise a distributed container service module (e.g., distributed container service module $142_3$ and distributed container service module $142_4$) which can be implemented in master/slave relationships. More particularly, any virtualized controller can be designated as a MASTER, and any other virtualized controller can be designated as a SLAVE. In some cases there may be multiple instances of virtualized controllers that are designated as a SLAVE (e.g., SLAVE1 and SLAVE2, as shown). A SLAVE can switch over to serve as a MASTER if so determined. In a situation where a MASTER fails (as depicted in FIG. 1D5), a SLAVE might detect the loss of the MASTER, and might pick-up MASTER responsibilities. Such a transition is depicted in FIG. 1D5, where a former SLAVE (e.g., SLAVE1 of FIG. 1D4) automatically picks-up the responsibilities of the former MASTER (e.g., the MASTER of FIG. 1D4).

The modules as shown and discussed in the foregoing combine to facilitate setup, deployment, and publishing of containers within a virtualization environment. Further, as discussed in the following figures FIG. 1E, FIG. 1F, and FIG. 1G, the herein disclosed techniques serve to establish a container-centric environment that supports configuration and invocation of groups of containers.

FIG. 1E presents a flowchart of an environment preparation technique 1E00 as used by administrators (e.g., system admins or cluster admins) in systems for configuring, deploying, and managing containers in a virtualization environment. As an option, one or more variations of environment preparation technique 1E00 or any aspect thereof may be implemented in the context of the architecture and functionality of the embodiments described herein.

The embodiment of FIG. 1E is merely one example for configuring an environment. As shown, an administrator accesses a UI (e.g., user interface 131) to establish a set of privileges (step 172). The privileges can be assigned to any aspect of actions to be taken, whether by a user or by a virtual machine or by a container. The actions taken can span the entire scope of operations performed on nodes (e.g., networking configurations), operations performed within clusters (e.g., storage configuration), and/or operations performed that relate to aspects of inter-cluster operation and/or cluster-to-external facility operation (e.g., security operations).

Specifically, privileges can be established that pertain to safe access to external repositories of containers (e.g., a docker site). When a safe access technique and corresponding privileges are established and enforceable (e.g., possibly by restricting access to external sites only through a hardened instance of a container service machine) the administrator can configure (and make available to users) a retrieval capability to access external container registries and container repositories 174. In some cases, the retrieval capability includes downloading through hardened ports. Accordingly at step 176, the administrator configures WAN and/or LAN ports, possibly through configuration of a router and/or configuration of VLANs. Additionally, the environment preparation technique 1E00 can include configuring storage areas, including specific locations and/or devices in the storage pool (step 178). As one specific case, using the environment preparation technique 1E00 or any aspect thereof an administrator can specify which storage areas can be used to create volume groups (e.g., to establish volumes to be used as persistent storage for user containers).

In some cases, certain external repositories of containers are configured as whitelisted or preferred sites, and others might be blacklisted or blocked or otherwise restricted from access, while still others might be only partially restricted. In some cases specific downloads identified by a filename or file checksum are restricted.

Figure 1F:
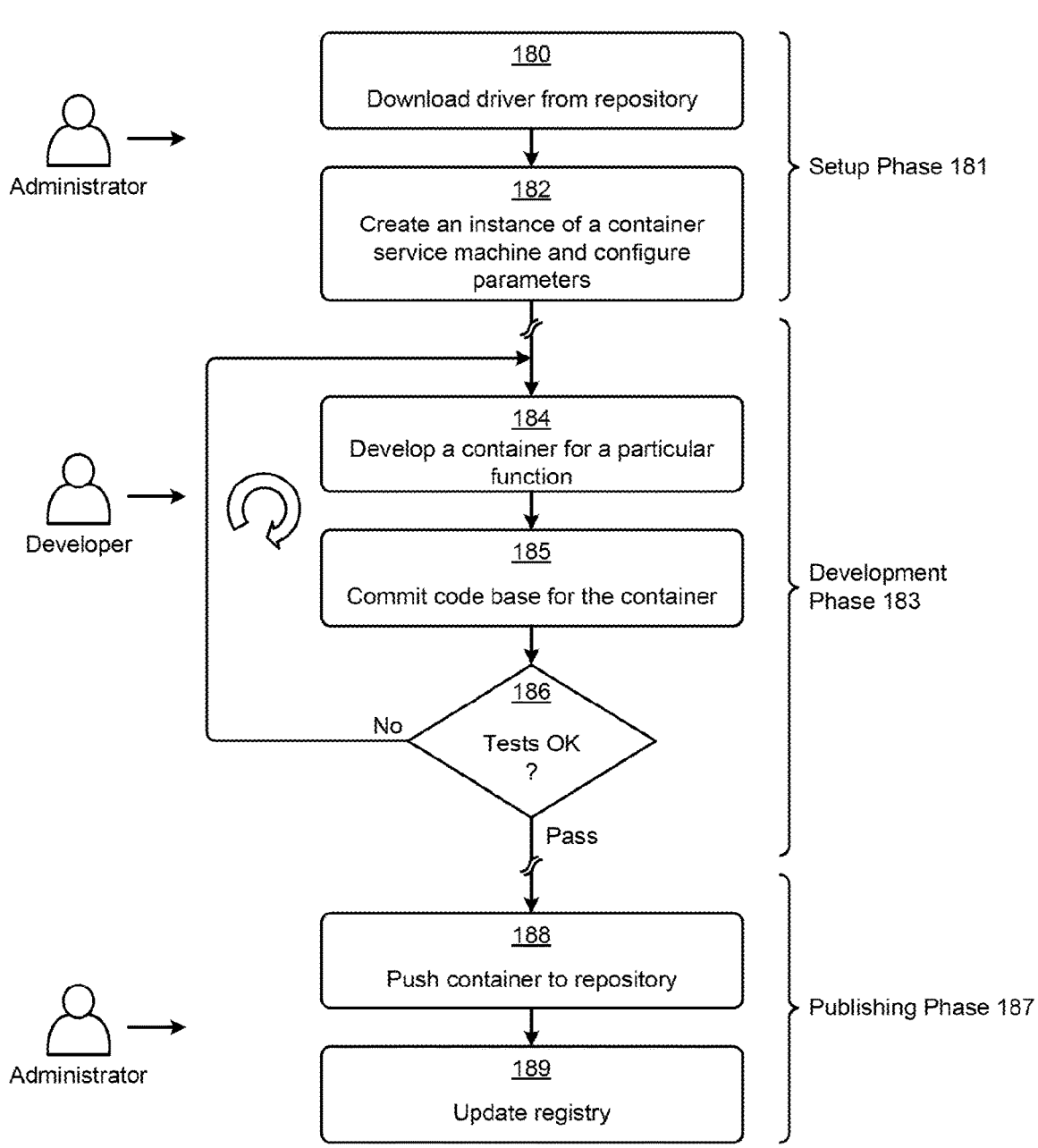
FIG. 1F presents a flowchart of a multi-phase workflow as used by administrators and developers in systems for configuring, deploying, and managing containers in a virtualization environment, according to an embodiment.

The environment so established, either by default values or resulting from acts taken during environment preparation, serves for ease of progression through a workflow as shown and discussed as pertaining to FIG. 1F.

FIG. 1F presents a flowchart of a multi-phase workflow 1F00 as used by administrators and developers in systems for configuring, deploying, and managing containers in a virtualization environment. As an option, one or more variations of multi-phase workflow 1F00 or any aspect thereof may be implemented in the context of the architecture and functionality of the embodiments described herein. The multi-phase workflow 1F00 or any aspect thereof may be implemented in any environment.

The embodiment shown in FIG. 1F is merely one example. The shown workflow includes a setup phase 181, a development phase 183, and a publishing phase 187. In the setup phase, an administrator or privileged user downloads a driver and/or toolkit from a preconfigured location (step 180). The downloaded driver and/or components in the toolkit are sufficient to create an instance of a container service machine (step 182) within the environment established prior to, or in conjunction with, the performance of environment preparation technique 1E00. Operations available during creation of an instance of a container service machine include specification of sizing parameters, including quotas or limits pertaining to node or cluster resources (e.g., CPU usage limits, memory usage limits, disk size limits, etc.).

Concurrently or sequentially, a developer can avail of the environment and/or container service machine as established during the setup phase. Specifically, a developer can develop a container for a specific function (step 184), possibly writing container code from scratch, or possibly using any containers that were made available through the container registry and container repository. At some moment in time the developer will commit code to a code repository (step 185), and perform tests (decision 186) using the committed code. The various activities in the development phase may be repeatedly performed in a loop and, as shown, until such time as the developer deems that the tests pass. In some cases, the tests performed include connecting to the aforementioned instance of container service machine (step 182), which in turn provides a preconfigured environment in which the developer can test the newly-developed container in an in situ setting.

The container can be published for use by others. Specifically, the developer or administrator can push the newly-developed container to a repository (step 188) and update the corresponding registry (step 189). In some cases, a user or administrator might want to remove and/or deregister a previously published container. Such a facility is provided via the user interface 131.

In some cases a developer may partition an application into many interrelated containers. A group of interrelated containers can be identified as an application group. Such a group can be managed by facilities provided by the control virtual machine $130_1$ and/or the container service machine 150. Specifically, mapping of an instance of a container to a particular node and/or to a particular container service machine can be performed with or without user intervention. One flow for container-to-node mapping is shown and described in FIG. 1G.

Figure 1G:
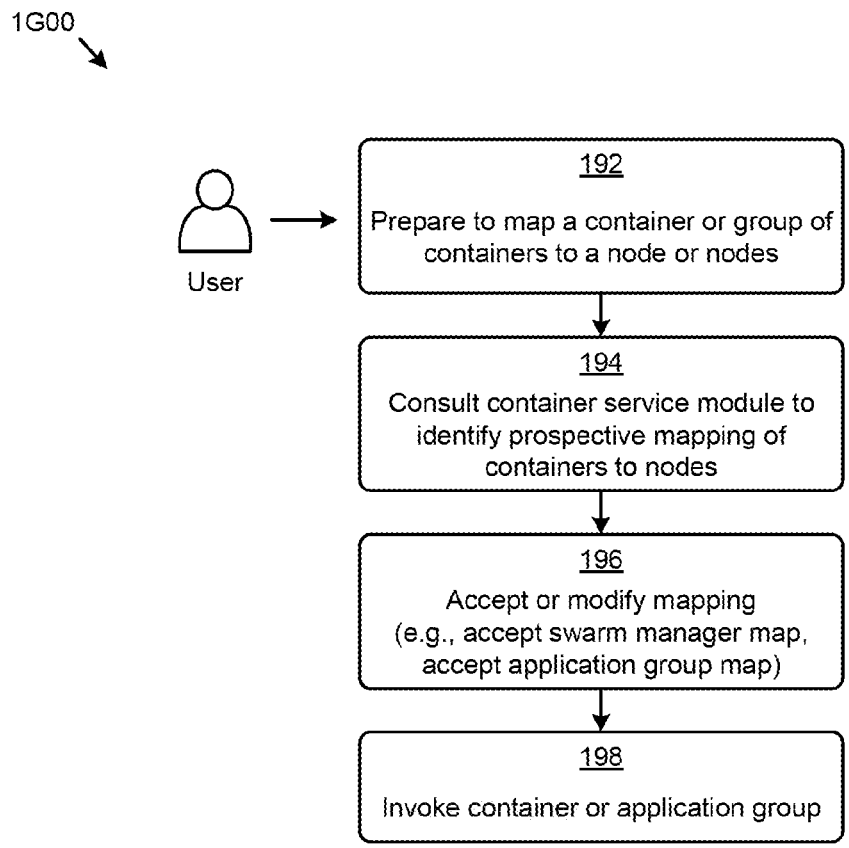
FIG. 1G presents a flowchart of a container-to-node mapping technique as used in systems for configuring, deploying, and managing containers in a virtualization environment, according to an embodiment.

FIG. 1G presents a flowchart of a container-to-node mapping technique 1G00 as used in systems for configuring, deploying, and managing containers in a virtualization environment. As an option, one or more variations of container-to-node mapping technique 1G00 or any aspect thereof may be implemented in the context of the architecture and functionality of the embodiments described herein. The container-to-node mapping technique 1G00 or any aspect thereof may be implemented in any environment.

A user might want to map a container or group of containers to a node or group of nodes (step 192). In some cases, a user might prepare a map a priori, such as in cases where the user is self-managing node allocations. In other cases, a user might want to merely identify a container or group of containers as belonging to an application group, and then allow the container service machine or other facility to perform the mapping. In the latter case, a user might consult a container service module to identify prospective mapping of containers to nodes (step 194). The user can then accept a mapping, or can modify a mapping (step 196). Upon acceptance of the modified or unmodified mapping, the user can invoke the container or application group (step 198).

The foregoing configuration examples are merely some examples. Many variations for deployment of containers or groups of containers, whether hosted within a container service machine or whether hosted on bare metal, are possible within the scope of systems that are configured using the aforementioned techniques. Moreover, the herein-disclosed architecture for managing I/O and storage for a virtualization environment using executable containers and virtual machines can be flexibly mapped onto a wide variety of hardware configurations, including onto a small number of nodes (e.g., one node), or onto an array of many nodes, or onto a fully-configured cluster comprising many nodes and a storage pool, or onto multi-cluster platforms, etc. Further, various use models are supported by various respective partitioning of computing resources and storage facilities.

FIG. 1H and FIG. 1I present a flowcharts of storage pool use models. The flow 1H00 commences upon initialization of a control virtual machine to expose a storage pool to computing resources (step 1H10). A user might retrieve an executable container from a container repository (step 1H30) and use ancillary functions (e.g., API calls) to register the retrieved executable container with the control virtual machine (step 1H40). The control virtual machine then invokes the executable container (step 1H50). The executable container might need to define and/or access persistent storage, at which time the control virtual machine receives storage access I/O commands issued from the executable container (step 1H60). Additional storage access I/O commands can be issued from the executable container, which cause the control virtual machine to process the additional storage access I/O commands (step 1H80). Processing of storage I/O commands by the control virtual machine can include initiation of actions that are performed by, or for, or within the storage devices of the storage pool.

Flow 1I00 depicts a use model that includes a container service machine. As shown, the flow commences upon initialize a control virtual machine to expose a storage pool (step 1I10). Another step initializes a container service machine to access the storage pool through the control virtual machine (step 1I20). A user or administrator might take actions to retrieve an executable container from a container repository (step 1I30), which executable container is used to populate the retrieved executable container into the container service machine (step 1I40). The container service machine invokes the executable container (step 1I50). The executable container raises storage I/O commands which are in turn received by the container service machine (step 1I60). In some cases, the storage access I/O commands issued from the executable container are received and responded to by the container service machine (step 1I60). In other cases, the storage access I/O commands issued from the executable container are forwarded by the container service machine to a control virtual machine (step 1I70). In such cases, the control virtual machine responds to the storage access I/O commands by performing operations in accordance with the storage access I/O commands and/or forwarding modified or unmodified storage access I/O commands so as to cause initiation of actions that are performed by, or for, or within the storage devices of the storage pool (step 1I80). The aforementioned steps of FIG. 1H and FIG. 1I are merely examples, and other flows and partitions are possible so as to accommodate various computing loads and/or reliability factors such as are found highly concurrent computing scenarios and/or in highly resilient configurations.

In particular, the partitions of FIG. 1D3, FIG. 1D4, and FIG. 1D5 depict how virtualized controller functions can be freely partitioned or moved between virtual machine implementations and containerized implementations. As shown, the distributed container service module $142_2$ comprises a swarm manager 136. Virtualized controller functions (e.g., the shown swarm manager) can be implemented within any variations of a virtualized controller (e.g., implemented as or within a virtual machine or implemented as or within a container). The example of a swarm controller is merely one example of functions that can be freely partitioned. Any functions or groups of functions can be freely partitioned or moved between a virtual machine implementation and a containerized implementation so as to facilitate inter-function communication (e.g., to reduce I/O over the links and instead rely on intra-process communication such as subroutine calls).

Merely as an example partitioning of services between container service machine and a control virtual machine, FIG. 3 depicts a single-node configuration 300. As an option, one or more variations of single-node configuration 300 or any aspect thereof may be implemented in the context of the architecture and functionality of the embodiments described herein. The single-node configuration 300 or any aspect thereof may be implemented in any environment.

More specifically, FIG. 3 illustrates an example architecture of a node configuration 300 implementing a container service machine 150 and a control virtual machine $130_4$. Additionally, node configuration 300 comprises an operating system $102_7$, with a hypervisor $104_6$. In this embodiment the container service machine 150 includes an operating system, such as Linux, that supports container technologies. As illustrated, the container service machine has a root directory 307, which corresponds to the container service machine's instance of a root file system 308. Further, the container service machine 150 comprises two example containers, a MySQL container 310, which runs a MySQL server, and a retail website container 312, which runs an example retail website.

Each container runs as a virtualized computer in that each container comprises an isolated file system, a process environment with its own processes, and an IP address. A container's file system may comprise a base image (e.g., Ubuntu), and may layer on additional images and application execution layers (e.g., MySQL, web services), as necessary. In some implementations, the multiple layers that make up a given container appear as single file system using a union mount process. Using union mounts, changes to a read-only layer may be completed using a copy-on-write operation, where the file to be modified in the read-only layer is copied to an execution space where the changes are made to the copied file.

As mentioned, a container service machine can implement containers as a forms of isolated file systems. As such, applications running from within one container do not "see"

other containers as sibling directories in the root file system 308. Instead, applications running in a container only see and work with their own containerized file systems, which appear to the applications as "true root" directories though they are not. Thus, containers provide security measures against malicious activities by isolating applications within a container execution environment while still allowing containerized applications to be installed and run with low system requirements.

An additional advantage of the node configuration 300 is that each container is running within a container service machine, which provides an additional robust layer of network security. For example, if a malicious web user compromises the retail website container 312 to gain admin access to the root file system 308, the malicious user is still trapped within the retail website container service machine. As such, the malicious user has not gained access to the node's operating system.

In some embodiments, containers running applications of different sensitivity levels (e.g., different admin policies or service level agreements (SLAs)) may be placed in different container service machines for further isolation. For example, if a malicious web user compromises the retail website container 312 and gains access to the root file system 308, the malicious web user might then be able use that access to compromise the MySQL container 310 (which may contain credit card information, etc., belonging to retail website customers) or any other containers running on top of the root file system 308. Instead, sensitive containers (e.g., containers running applications with sensitive information) may be placed on a separate container service machine, such as isolated VMs 320. As such, if the retail website container 312 is breached, the malicious user has not gained access to applications or information in the isolated VMs 320.

In some embodiments, containers on the container service machine such as a My SQL server with non-sensitive information may interface with the isolated VMs 320 through a container interface module 322, which may run as a web application that uses TCP/IP protocol to retrieve or store sensitive information in the isolated VMs 320 (e.g., using tokens, keys). One of ordinary skill in the art can appreciate that the container interface module 322 may be run directly on the root file system 308 as an application of the container service machine, or it may run as an application in any other container.

Further, container interface module aspects may be implemented as a layer within any of the containers running on the container service machine 150. For example, the MySQL container 310 may be modified with an additional layer or application with specialized interface instructions, such that when sensitive information is queried (e.g., created, modified, updated, or deleted) by the MySQL application, the container interface module layer is invoked to send the query to an isolated VM 320, which may then store it in its isolated environment. Further, one of ordinary skill in the art appreciates that the isolated VM 320 may comprise containerized applications or run applications directly on its VM operating system.

FIG. 3 also illustrates a control virtual machine $130_4$ running above the hypervisor $104_6$. As explained above, the control virtual machine may act as the storage controller for the node configuration 300. As such, although a container running in the container service machine appears as a logical directory with files (e.g., the folders/directories inside retail website container 312), the creation and/or modification of that container's directory corresponds to I/O operations that occur through the container service machine, which writes to its vDisk 170 through the control virtual machine $130_4$.

For example, if an application running in the retail website container 312 stores data, the application may create a directory within the container and store the data inside the newly created directory. However, the actual I/O operations occur through the operating system on the container service machine. The operating system on the container service machine writes to its exposed vDisk (e.g., as exposed by the control virtual machine $130_4$), which further corresponds to an iSCSI request that is directed to the control VM to be handled in a distributed manner (e.g., using control virtual machine administrative modules $314_1$), as explained in further detail below.

FIG. 4 illustrates a one-container-service-machine-per-node architecture 400 as used in systems that support cluster-wide configuration of containers in a virtualization environment. As an option, one or more variations of one-container-service-machine-per-node architecture 400 or any aspect thereof may be implemented in the context of the architecture and functionality of the embodiments described herein. The one-container-service-machine-per-node architecture 400 or any aspect thereof may be implemented in any environment.

FIG. 4 illustrates an alternative container-within-container architecture that can be used to implement a virtualized computer storage environment, according to some embodiments. In FIG. 4, each node (e.g., node $202_3$ and node $202_4$) implements a respective instance of service container $404_1$ and service container $404_2$ (e.g., each being instances of a container service machine 150). The service container $404_1$ and service container $404_2$ may be implemented as distributed storage controllers for the shown user containers using a routing table as discussed infra. The nodes of FIG. 4 might have an operating system (e.g., operating system $102_8$, operating system $102_9$). In some cases, the containers might have sufficient operating system resources such that an operating system image is not needed in this container-within-container architecture.

FIG. 5 illustrates a one-control-virtual-machine-per-node architecture 500 as used in systems that support cluster-wide configuration of containers in a virtualization environment. As an option, one or more variations of one-control-virtual-machine-per-node architecture 500 or any aspect thereof may be implemented in the context of the architecture and functionality of the embodiments described herein. The one-control-virtual-machine-per-node architecture 500 or any aspect thereof may be implemented in any environment.

FIG. 5 illustrates an alternative architecture that may be used to implement a virtualized computer storage environment, according to some embodiments. There, each node (e.g., node $202_5$ and node $202_6$) implements user containers directly on the nodes' operating system. Further, the service virtualized machines are implemented as control virtual machine $130_5$ and control virtual machine $130_6$, respectively, above the hypervisors. The nodes of FIG. 5 include an operating system (e.g., operating system $102_{10}$, operating system $102_{11}$) that comports with respective hypervisors (e.g., hypervisor $104_7$ and hypervisor $104_8$).

The shown embodiment includes a plurality of nodes (e.g., $202_5$ and node $202_6$) wherein each node of the plurality of nodes includes a control virtual machine that is configured to operate as a storage controller dedicated to the node (e.g., control virtual machine $130_5$ and control virtual machine $130_6$) as well as one or more user containers per node (e.g., user container $252_{51}$, user container $252_{52}$, user container $252_{53}$, user container $252_{61}$, user container $252_{62}$, and user container $252_{63}$). The shown plurality of storage devices in the storage pool 242 are accessed by the one or more user containers via storage access I/O commands (e.g., vDisk I/O) through a corresponding node-specific control virtual machine. The node-specific control virtual machines are each configured to manage and/or facilitate access by the user containers to the plurality of storage devices. Use of vDisks (as shown) is merely one embodiment and other storage I/O can be initiated by a user container, then delivered to a respective node-specific control virtual machine, which node-specific control virtual machine in turn carries out storage I/O to and from the storage devices. Strictly as one example, if a container requests file system operations such as creating a directory and then issues requests to store a file in that directory, the file system operations are at first initiated by the user container, then received by the node-specific control virtual machine. In some cases the container-initiated file system operations are reformatted before being performed by the node-specific control virtual machine. For example, the actual I/O operations to be performed on storage devices in the storage pool are formed by the node-specific control virtual machine as I/O requests and delivered to the storage device pertaining to the file.

Figure 6:
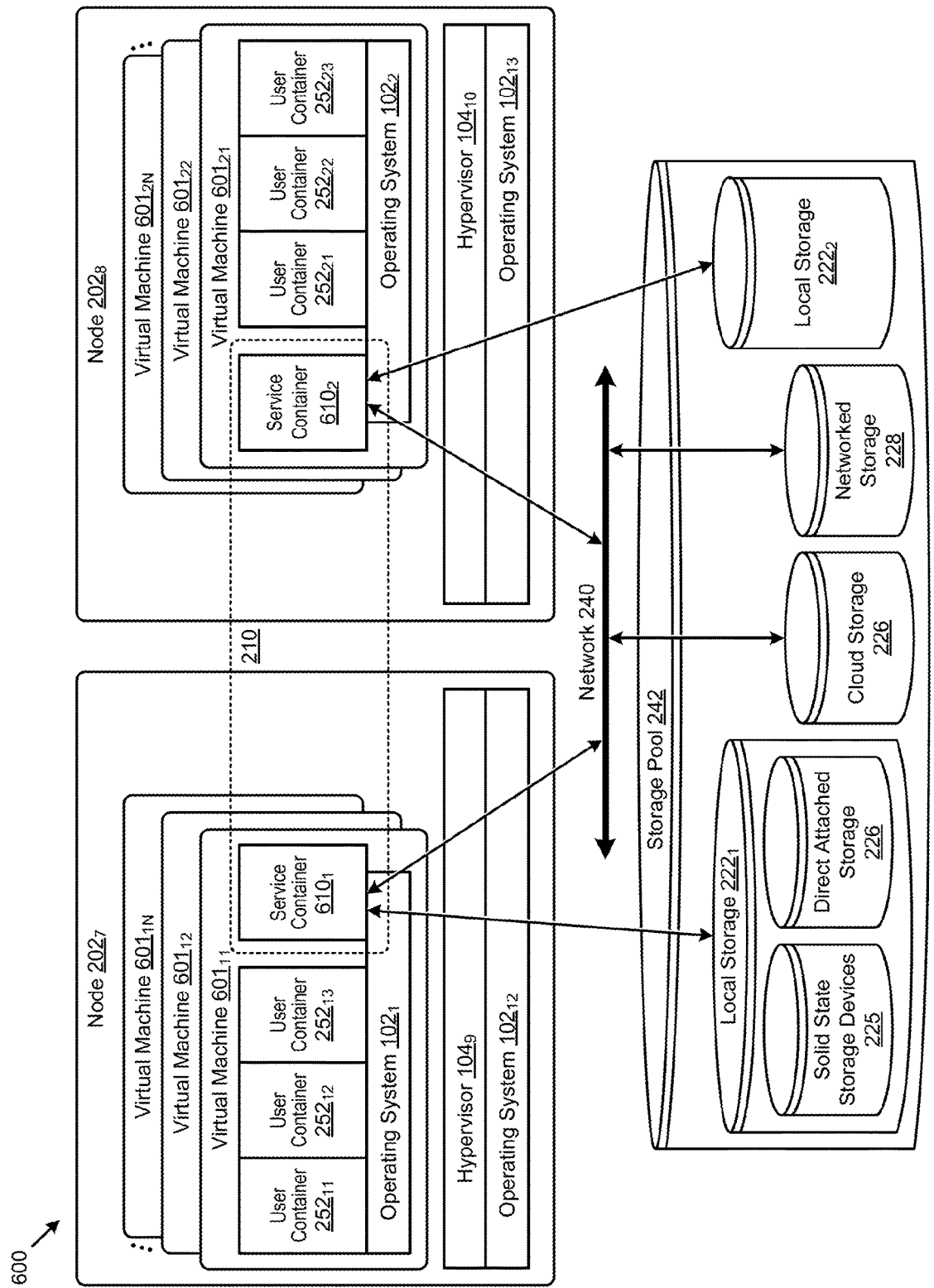
FIG. 6 illustrates a foreign OS architecture as used for running containers on top of a foreign OS in systems that support cluster-wide configuration of containers in a virtualization environment, according to an embodiment.

FIG. 6 illustrates a foreign OS architecture 600 as used for running containers on top of a foreign OS in systems that support cluster-wide configuration of containers in a virtualization environment. As an option, one or more variations of foreign OS architecture 600 or any aspect thereof may be implemented in the context of the architecture and functionality of the embodiments described herein. The foreign OS architecture 600 or any aspect thereof may be implemented in any environment.

FIG. 6 illustrates an alternative architecture that may be used to implement a virtualized computer storage environment, according to some embodiments. There, each node (e.g., node $202_7$ and node $202_8$) runs a hypervisor (e.g., hypervisor $104_9$ and hypervisor $104_{10}$) on its respective operating system (e.g., operating system $102_{12}$, operating system $102_{13}$). Above the hypervisors, virtual machines (e.g., virtual machine $601_{11}$, virtual machine $601_{12}$, . . . , virtual machine $601_{1N}$; virtual machine $601_{21}$, virtual machine $601_{22}$, . . . , virtual machine $601_{2N}$) are instantiated. Any of those virtual machines run combinations of user containers (e.g., user container $252_{11}$, user container $252_{12}$, user container $252_{13}$, user container $252_{21}$, user container $252_{22}$, and user container $252_{23}$) as well as a respective service container (e.g., service container $610_1$ and service container 6102).

FIG. 7A, FIG. 7B1, FIG. 7B2, FIG. 7B3, and FIG. 7C illustrate various inter-node communication techniques as used in systems that support configuring, deploying, and managing containers in a virtualization environment. As an option, one or more variations of inter-node communication techniques or any aspect thereof may be implemented in the context of the architecture and functionality of the embodiments described herein. The inter-node communication techniques or any aspect thereof may be implemented in any environment.

Figure 7A:
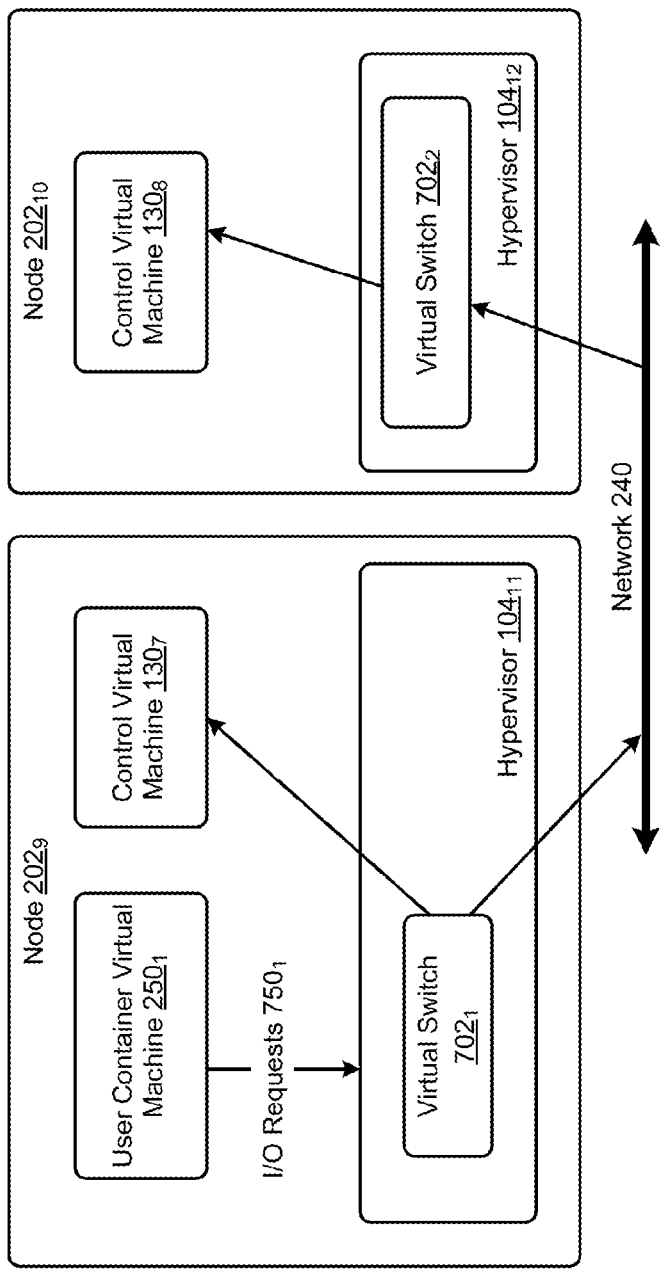

FIG. 7A illustrates an example approach that can be taken in some embodiments to submit I/O requests to the control VMs (e.g., control virtual machine $130_7$ and control virtual machine $130_8$) as received from a user VM, or from a subsumed user container. For example, in this approach, two node configurations are depicted, namely node $202_9$ and node $202_{10}$. The user container virtual machine $250_1$ comprising one or more user containers sends I/O requests $750_1$ to the control VMs in the form of iSCSI or NFS requests.

The I/O request may correspond to a file system action within any of the aforementioned containers. For example, if a container performs file system operations such as creating a directory within its user virtual machine and stores a file in the directory, the file system operations are performed on the vDisk for that VM. However, the actual I/O operations are formed as I/O requests and handled by the control virtual machine.

The term "iSCSI" or "Internet small computer system interface" refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In another embodiment, the container service machine sends I/O requests $750_1$ to the control VMs in the form of NFS requests. The term "NFS" or "network file system" interface refers to an IP-based file access standard in which NFS clients send file-based requests to NFS servers via a proxy folder (directory) called "mount point". Going forward, this disclosure will interchangeably use the term iSCSI and NFS to refer to the IP-based protocol used to communicate between the hypervisor and the control VM. Note that while both protocols are network-based, the currently described architecture makes it possible to use them over the virtual network within the hypervisor. No iSCSI or NFS packets will need to leave the machine, because the communication—the request and the response—begins and ends within the single hypervisor host.

The container service machine structures its I/O requests $750_1$ into the iSCSI format. The iSCSI or NFS request designates the IP address for a control VM from which the user desires I/O services. The iSCSI or NFS I/O request is sent from the container service machine to a virtual switch $702_1$ within hypervisor $104_{11}$ to be routed to the correct destination. If the request is intended to be handled by the control VM within the same server, then the iSCSI or NFS request is internally routed within that server to the control virtual machine $130_7$. As described in more detail below, the control virtual machine $130_7$ includes structures and/or modules, such as the aforementioned control virtual machine administrative modules $314_1$ (see FIG. 3) to properly interpret and process the I/O requests $750_1$.

It is also possible that the iSCSI or NFS request will be handled by a control VM on another server. In this situation, the iSCSI or NFS request will be sent by the virtual switch $702_1$ to a real physical switch to be sent across the network 240 to the other server. The virtual switch $702_2$ within hypervisor $104_{12}$ will then route the request to the control virtual machine $130_8$ for further processing.

In some embodiments, the I/O requests $750_1$ from the user container virtual machine $250_1$ is a part of a SCSI protocol request to a storage device. The hypervisor may convert the SCSI request into an iSCSI or an NFS request as part of its hardware emulation layer. In other words, the virtual SCSI disk attached to the user VM is either an iSCSI LUN or an NFS file in an NFS server. In this approach, an iSCSI initiator or the NFS client 806 software may be implemented within the hypervisor to convert the SCSI-formatted requests into the appropriate iSCSI- or NFS-formatted requests that can be handled by the control virtual machine $130_8$.

According to some embodiments, a control VM runs the Linux operating system. As noted above, since the control VM exports a block device or file access interface to the user VMs, the interaction between the container service machines and the control VMs follows the iSCSI or NFS protocol, either directly or indirectly via the hypervisor's hardware emulation layer.

FIG. 7B1 illustrates an approach for implementing user containers (e.g., user container instance $252$) in conjunction with container service machines (e.g., container service machine $150_1$, container service machine $150_2$). In this embodiment, I/O requests $750_2$ are directed to the OS of node $202_{11}$. For instance, the I/O request is directed to a virtual router (i.e., virtual router $752_1$, virtual router $752_2$) that directs the I/O request to the container service machine for that node (e.g., container service machine $150_1$, container service machine $150_2$). In some embodiments, the virtual router $752_1$ corresponds to a mount point, such as a LUN that corresponds to a storage volume. The OS is configured to create all containers on a storage device that is mapped to the mount point or LUN. In some embodiments, the I/O requests $750_2$ may be directed to the storage volume mapped to the mount point or LUN by writing or reading data from that storage volume. The container service machines $150_1$ may operate on data in the storage volume and move it to the distributed storage pool over network $240$. Data in the storage pool can be read by other nodes such as node $202_{12}$. In some embodiments, the OS may directly implement a virtual switch (e.g., the aforementioned virtual switch $702_1$, virtual switch $702_2$) of FIG. 7A. In some embodiments, the user container instance $252$ can directly mount or direct iSCSI requests $788$ directly to the container service machine $150_1$.

In some node implementations, such as is shown as node $202_{12}$, a virtual router $752_2$ may be part of a modified operating system that handles all container I/O operations by forwarding them to the container service machine $150_2$ using a routing table or other configured parameter.

FIG. 7B2 illustrates an approach for implementing user containers (e.g., user container instance $252$) in conjunction with container service machines (e.g., container service machine $150_1$, container service machine $150_2$). In this embodiment, I/O requests $750_2$ are written to, and read from, a shared memory facility that is accessible for READ and WRITE by two or more different nodes.

The nodes are each configured to manage and/or facilitate access by a user process (e.g., a user container or a user container within a user container virtual machine) to a plurality of storage devices. Storage I/O commands can be communicated (e.g., read and/or written) between nodes using an arrangement of message passing and/or mailboxes, and/or locks, and or semaphores implemented using the shared memory facility. Use of iSCSI (e.g., iSCSI requests $788$) is merely one embodiment and other storage I/O can be initiated or carried out in accordance with any storage device protocol or command set.

The shared memory facility serves to implement a delivery mechanism such that a target node (e.g., node $202_{12}$) can carry out storage I/O to and from the storage devices on behalf of a user container instance in a different node (e.g., node $202_{11}$). Strictly as one example, if a container performs file system operations such as creating a directory and then stores a file in that directory, the file system operations initiated by the user container can be monitored by and/or performed by a node-specific virtual machine (e.g., a control virtual machine or a container service machine). The actual I/O operations to be performed on storage devices in the storage pool are formed by the node-specific virtual machine as I/O requests and delivered to the storage device or devices that store the file. File and directory I/O communicated over a shared memory facility is merely one example of managing storage I/O between virtual machines. Communication between two or more virtual machines can be carried out using any known inter-node communication techniques. In some cases file I/O is performed over a virtual disk.

The configurations and partitioning as depicted in the foregoing can be combined, reconfigured and/or repartitioned. FIG. 7B3 illustrates an example approach that can be taken in some embodiments to process I/O requests using control VMs that receive storage I/O raised by an executable container. The shown flow 7B300 implements a multi-node storage I/O transaction using two nodes that share a common memory space (e.g., using a shared memory bus or remote direct memory access or other protocol). The flow commences by configuring a first node to host a control virtual machine (step $791$), and also configuring a second node to host an executable container (step $792$). The executable container writes a storage I/O command to a memory area that is shared by the first node and the second node (step $793$). Using any know technique, the control virtual machine is notified of the existence of the written storage I/O command, after which notification the control virtual machine reads the written storage command from the memory area that is shared by the first node and the second node (step $794$). The control virtual machine hosted on the first node processes the read storage command (step $795$), which processing includes initiating actions pertaining to the storage I/O command so as to cause processing of one or more storage operations by storage devices in the storage pool (step $796$).

Various shared memory access techniques support zero-copy networking by enabling a network switch or network router or other adapter to transfer data directly to and/or from node-local memory areas (e.g., memory areas allocated by a process running on a node) to and/or from shared memory areas, thus eliminating the need for the network switch or network router or other adapter to be involved in copying data between shared memory and the process-allocated memory areas. Such transfers reduce the processing to be done by CPUs and reduces operating system context switches as well. Such transfers can be performed in parallel with other system operations. When a shared memory access read request or write request is performed, send/receive latency is reduced, which in turn facilitates fast, high volume message transfers as might be demanded by certain storage I/O operations or combinations thereof. Zero-copy networking can be used when creating and/or accessing virtual disks.

Figure 7C:
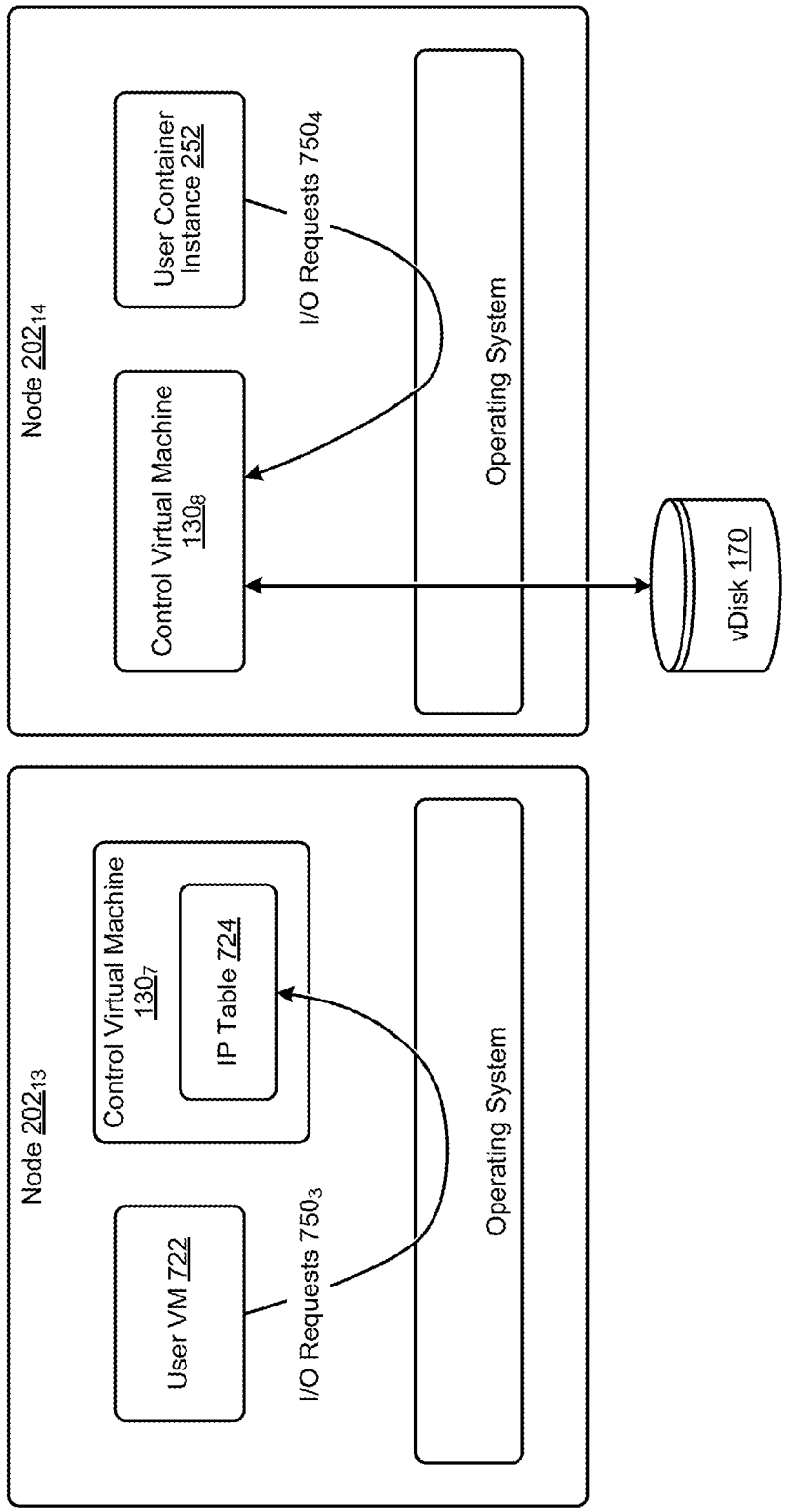

FIG. 7C includes a shared vDisk $170$. A vDisk can either be unshared (read and written by a single user VM) or shared (accessed by multiple user VMs or hypervisors). FIG. 7C illustrates a vDisk in a shared vDisk scenario. More specifically, the vDisk $170$ can be accessed by any one or more of a plurality of operational entities (e.g., containers, VMs, etc.) that are situated on different server nodes (e.g., node $202_{13}$, node $202_{14}$). In the example shown, the shared vDisk is owned by owner control virtual machine $130_8$ on node $202_{14}$. Therefore, all I/O requests for vDisk $170$ will be directed to this owner control virtual machine $130_8$ using standard IP forwarding (network address translation or NAT) rules in the networking stack of the control VMs.

For I/O requests $750_4$ from a user container instance $252$ that resides on the same server as the control virtual machine that owns the target I/O device (e.g., vDisk), the process to handle the I/O requests $750_4$ is conducted as described above. More specifically, in this embodiment, the I/O request from the user container instance $252$ is in the form of an iSCSI or NFS request that is directed to a given IP address. The IP address for the I/O request is common for all the control VMs on the different server nodes, however VLANs allow the IP address of the iSCSI or NFS request to be private to a particular (local) subnet, and hence the I/O request $750_4$ will be sent to the owner control virtual machine $130_8$ to handle the I/O request $750_4$. Since the owner control virtual machine $130_8$ recognizes that it is the owner of the vDisk 170, which is the subject of the I/O request $750_4$, the owner control virtual machine $130_8$ will directly handle the I/O request $750_4$.

As another example, consider the situation if a user VM 722 on a server node issues an I/O request $750_3$ for the shared vDisk 170, where the shared vDisk is owned by an owning instance of control virtual machine $130_8$ that is running on a different server local control virtual machine $130_7$. The local control virtual machine $130_7$ will recognize that it is not the owner of the shared vDisk 170, and will further recognize that owner control virtual machine $130_8$ is the owner of the shared vDisk 170. In this situation, the I/O request will be forwarded from local control virtual machine $130_7$ to control virtual machine $130_8$ so that the owner (owner control virtual machine $130_8$) can handle the forwarded I/O request. To the extent a reply is needed, the reply would be sent to the local control virtual machine $130_7$ to be forwarded to the user VM 722 that had originated the I/O request $750_3$.

In some embodiments, an IP table 724 (e.g., a network address table or NAT) is maintained inside the local control virtual machine $130_7$. The IP table 724 is maintained to include the address of remote server VMs. When the local control virtual machine $130_7$ recognizes that the I/O request needs to be sent to another control VM (e.g., owner control virtual machine $130_8$), the IP table 724 is used to look up the address of the destination control VM. This "NATing" action is performed at the network layers of the OS stack at the local control virtual machine $130_7$ whenever the local control virtual machine $130_7$ decides to send an IP packet to a control VM other than itself.

Figure 8:
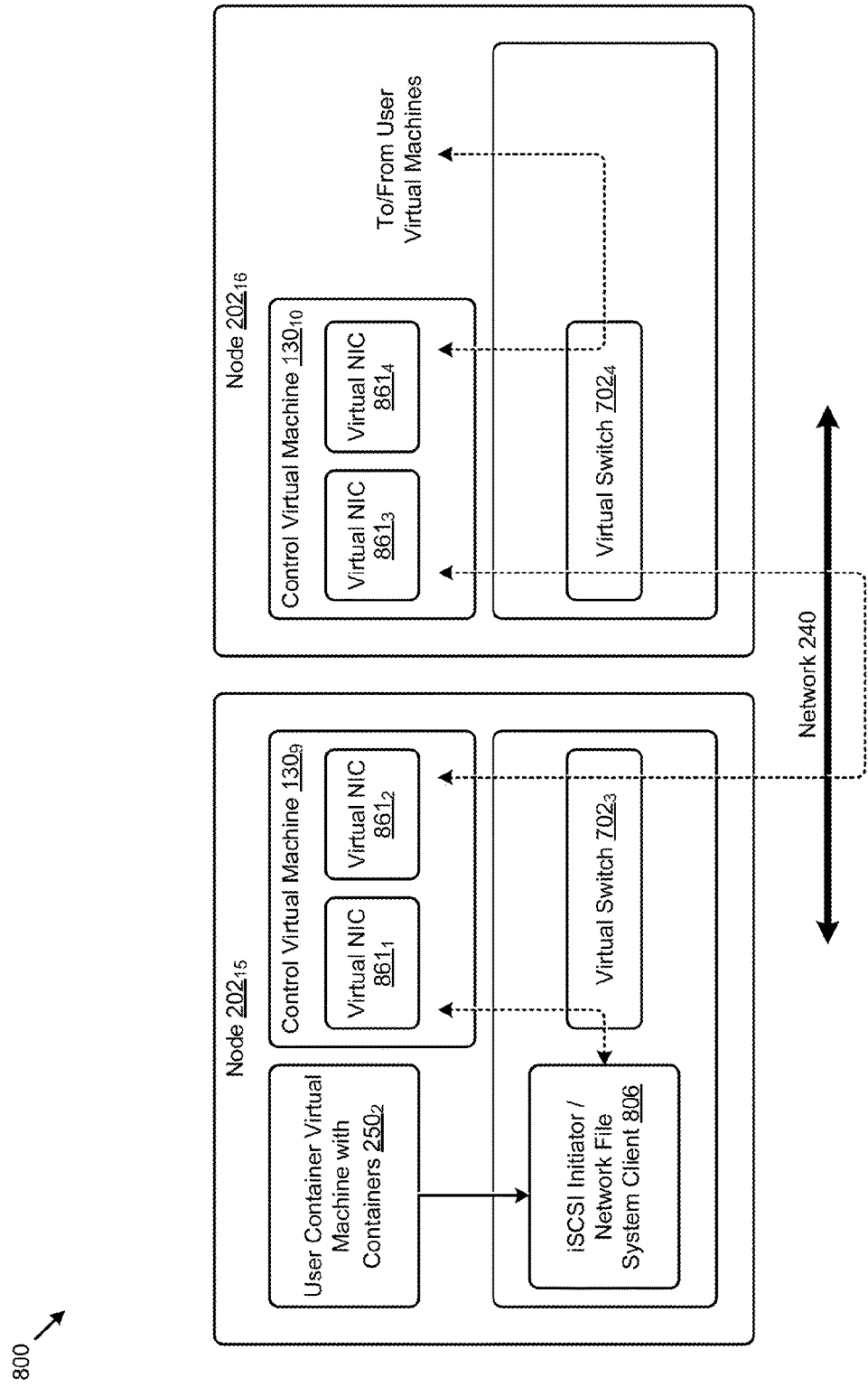
FIG. 8 illustrates container uses of VLAN communication techniques as used in systems that support configuring, deploying, and managing containers in a virtualization environment, according to an embodiment.

FIG. 8 illustrates container uses of VLAN communication techniques 800 as used in systems that support configuring, deploying, and managing containers in a virtualization environment. As an option, one or more variations of VLAN communication techniques 800 or any aspect thereof may be implemented in the context of the architecture and functionality of the embodiments described herein. The VLAN communication techniques 800 or any aspect thereof may be implemented in any environment.

For easy management of the appliance, the control VMs all have the same address (e.g., the same IP address or the same fully-qualified domain name or the same hostname) that is isolated by internal VLANs (virtual LANs in the virtual switch of the hypervisor). FIG. 8 illustrates this aspect of the architecture. The control virtual machine $130_9$ on node $202_{15}$ implements two virtual network interface cards (NICs), shown as virtual NIC $861_1$ and virtual NIC $861_2$. One of the virtual NICs corresponds to an internal VLAN that permits the user container virtual machine $250_2$ to communicate with the control virtual machine $130_9$ using the common IP address. The virtual switch $702_3$ routes all communications internal to node $202_{15}$ between the user container virtual machine $250_2$ and the control virtual machine $130_9$ using the first instance of virtual NIC $861_1$, where the common IP address is managed to correspond to the control virtual machine $130_9$ due to its membership in the appropriate VLAN.

The second instance of virtual NIC $861_2$ is used to communicate with entities external to node $202_{15}$, where the virtual NIC $861_2$ is associated with an IP address that would be specific to control virtual machine $130_{10}$ (and to no other control VM). The second instance of virtual NIC $861_2$ is therefore used to allow control virtual machine $130_9$ to communicate with other control VMs, for example, through virtual switch $702_4$, or such as control virtual machine $130_{10}$ on node $202_{16}$. It is noted that control virtual machine $130_{10}$ would likewise use VLANs and multiple virtual NICs (e.g., NIC $861_3$ and virtual NIC $861_4$) to implement management of the appliance.

Figure 9A:
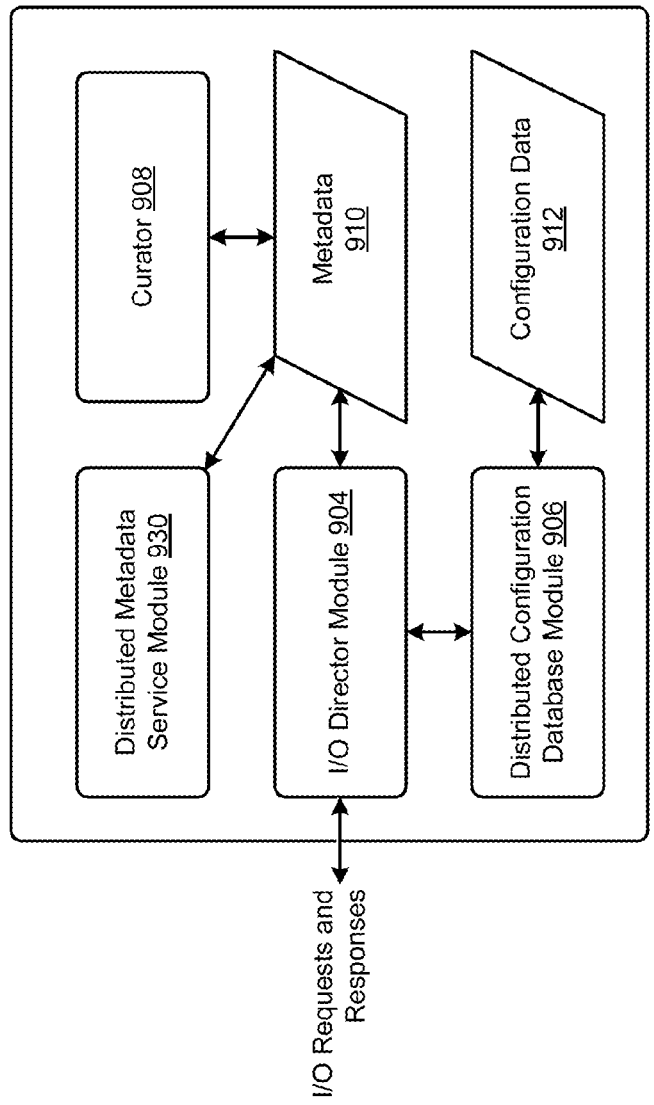
FIG. 9A and FIG. 9B illustrate alternative embodiments of a control virtual machine as used within systems for managing containers in a virtualization environment, according to an embodiment.
Figure 9B:
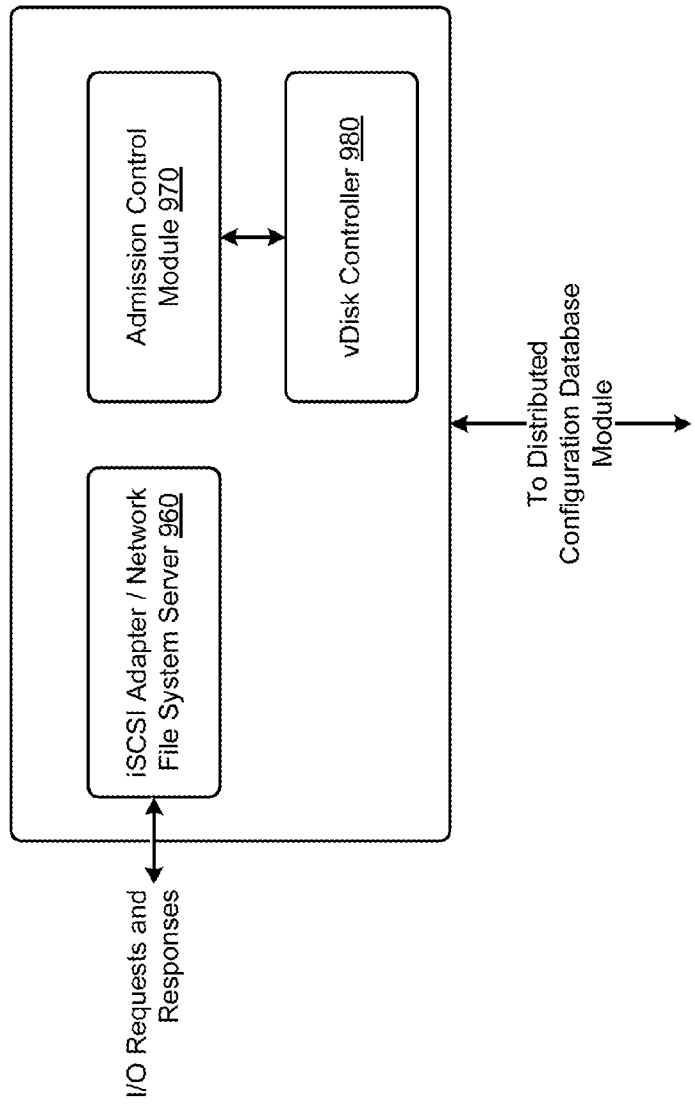

FIG. 9A and FIG. 9B illustrate alternative embodiments of a control virtual machine as used within systems for managing containers in a virtualization environment.

FIG. 9A illustrates the internal structures of a control virtual machine. In embodiments implementing control VMs as a service virtualized computer, the control VMs are not formed in reliance on specific implementations of hypervisors. Instead, the control VMs run as virtual machines above hypervisors on the various nodes. Since the control VMs run above the hypervisors, the current approach can be used and implemented within any virtual machine architecture because the control VMs of embodiments of the invention can be used in conjunction with any hypervisor from any virtualization vendor. Therefore, the control VM can be configured to operate ubiquitously anywhere within the computing environment, and does not need to be custom-configured for each different type of operating environment. This is particularly useful because the industry-standard iSCSI or NFS protocols allow the control VM to be hypervisor-agnostic.

In some embodiments, the main entry point into a control VM is the central controller module (e.g., the I/O director module 904). The term I/O director module is used to connote that fact that this component directs the I/O from the world of virtual disks to the pool of physical storage resources. In some embodiments, the I/O director module implements the iSCSI or NFS protocol server.

A write request originating at a container service machine is sent to the iSCSI or NFS target inside the control VM's kernel. This write is then intercepted by the I/O director module 904 running in user space. The I/O director module 904 interprets the iSCSI LUN or the NFS file destination and converts the write request into an internal vDisk request (e.g., as described in more detail below). Ultimately, the I/O director module 904 writes the data to the physical storage.

Each vDisk managed by a control VM corresponds to a virtual address space forming the individual bytes exposed as a disk to the container service machine. Thus, if the vDisk is 1 terabyte, the corresponding address space maintained would be 1 terabyte. This address space is broken up into equally sized units called vDisk blocks. Metadata 910 is maintained by the control VM to track and handle the vDisks and the data and storage objects in the system that pertain to the vDisks. The metadata 910 is used to track and maintain the contents of the vDisks and vDisk blocks.

To determine where to write and read data from the storage pool, the I/O director module 904 communicates with a distributed metadata service module 930 that maintains all the metadata 910. In some embodiments, the distributed metadata service module 930 is a highly available, fault-tolerant distributed service that runs on all control VMs in the appliance. The metadata managed by distributed metadata service module 930 is kept on the persistent storage attached to the appliance. According to some embodiments of the invention, the distributed metadata service module 930 may be implemented on SSD storage.

Since requests to the distributed metadata service module 930 may be random in nature, SSDs can be used on each server node to maintain the metadata for the distributed metadata service module 930. The distributed metadata service module 930 stores the metadata that helps locate the actual content of each vDisk block. If no information is found in distributed metadata service module 930 corresponding to a vDisk block, then that vDisk block is assumed to be filled with zeros. The data in each vDisk block is physically stored on disk in contiguous units called extents. Extents may vary in size when deduplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

A health management module (e.g., curator 908) is employed to address and remediate or "cure" any inconsistencies that may occur with the metadata 910. The curator 908 oversees the overall state of the virtual storage system, and takes actions as necessary to manage the health and efficient performance of that system. According to some embodiments of the invention, the curator 908 operates on a distributed basis to manage and perform these functions, where a master curator on a first server node manages the workload that is performed by multiple slave curators on other server nodes. In some cases map reduce (MR) operations are performed to implement the curator workload, where the master curator may periodically coordinate scans of the metadata in the system to manage the health of the distributed storage system.

Some of the control VMs also include a distributed configuration database module 906 to handle certain administrative tasks. The primary tasks performed by the distributed configuration database module 906 are to maintain the configuration data 912 for the control VM and act as a notification service for all events in the distributed system. Examples of configuration data 912 include, for example, the identity and existence of vDisks, the identity of control VMs in the system, the physical nodes in the system, and the physical storage devices in the system. For example, assume that there is a desire to add a new physical disk to the storage pool. The distributed configuration database module 906 would be informed of the new physical disk, after which the configuration data 912 is updated to reflect this information so that all other entities in the system can be made aware for the new physical disk. In a similar way, the addition/deletion of vDisks, VMs and nodes are handled by the distributed configuration database module 906 to update the configuration data 912 so that other entities in the system can be made aware of these configuration changes.

Another task that is handled by the distributed configuration database module 906 is to maintain health information for entities in the system, such as the control VMs. If a control VM fails or otherwise becomes unavailable, then this module tracks the health information so that any management tasks required of that failed control VM can be migrated to another control VM.

The distributed configuration database module 906 also handles elections and consensus management within the system. Another task handled by the distributed configuration database module is to implement ID creation. Unique IDs are generated by the distributed configuration database module as needed for any required objects in the system (e.g., for vDisks, control VMs, extent groups, etc.). In some embodiments, the IDs generated are 64-bit IDs, although any suitable type of IDs can be generated as appropriate for a particular embodiment. According to some embodiments, the distributed configuration database module may be implemented on an SSD storage device.

FIG. 9B illustrates the internal structures of the I/O director module 904 according to some embodiments of the invention. An iSCSI or NFS adapter 960 is used to convert the incoming/outgoing iSCSI or NFS requests that are in the iSCSI or NFS format (packet-based format) to information that can be used to identify the storage target of the request. In particular, the incoming/outgoing iSCSI or NFS requests can be converted into (1) a LUN ID number or (2) a file handle and offset of the storage object to be accessed.

If the I/O request is intended to write to a vDisk, then the admission control module 970 determines whether the control VM is the owner and/or is authorized to write to the particular vDisk identified in the I/O request. In some embodiments, a "shared nothing" architecture is implemented such that only the specific control VM that is listed as the owner of the vDisk is permitted to write to that vDisk. This ownership information may be maintained by distributed configuration database module 906, and can be observed or overridden by the vDisk controller 980.

If the control VM is not the owner, the distributed configuration database module 906 is consulted to determine the owner. The owner is then asked to relinquish ownership so that the current control VM can then perform the requested I/O operation. If the control VM is the owner, then the requested operation can be immediately processed.

Admission control module 970 can also be used to implement I/O optimizations as well. For example, quality of service (QoS) optimizations can be implemented using the admission control module 970. For many reasons, it is desirable to have a storage management system that is capable of managing and implementing QoS guarantees. This is because many computing and business organizations must be able to guarantee a certain level of service so as to implement a shared computing structure (e.g., to satisfy the contractual obligations of service level agreements).

Additional Embodiments of the Disclosure

Additional Practical Application Examples

Figure 10:
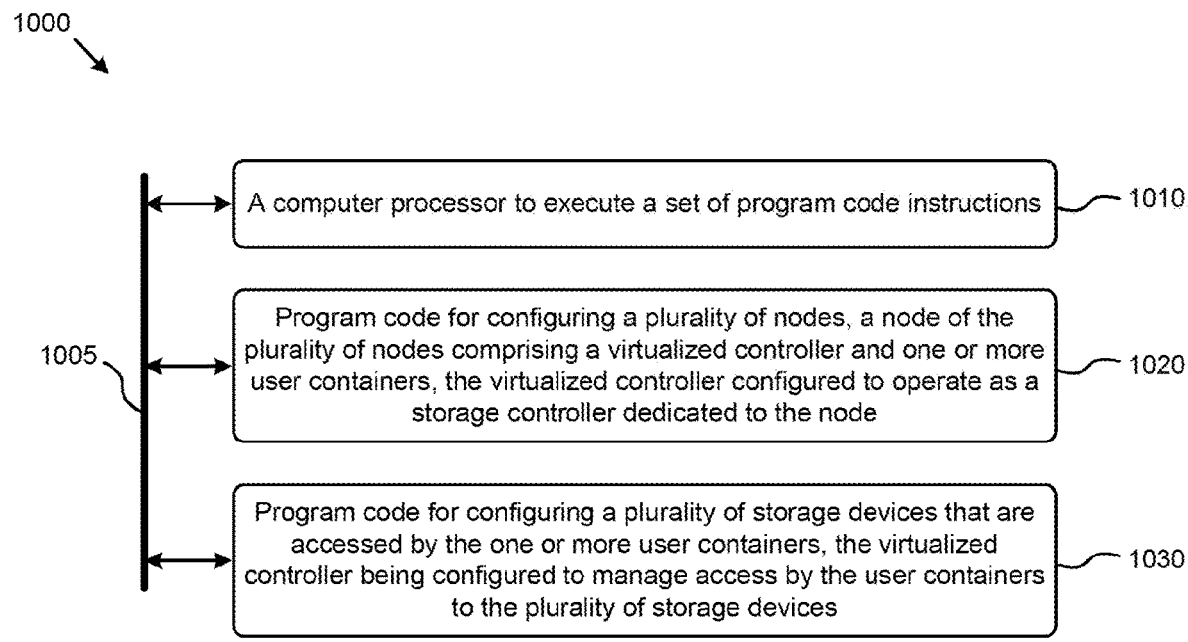
FIG. 10 depicts system components as arrangements of computing modules that are interconnected so as to implement certain of the herein-disclosed embodiments.

FIG. 10 depicts a system 1000 as an arrangement of computing modules that are interconnected so as to operate cooperatively to implement certain of the herein-disclosed embodiments. The partitioning of system 1000 is merely illustrative and other partitions are possible. FIG. 10 depicts a block diagram of a system to perform certain functions of a computer system. As an option, the system 1000 may be implemented in the context of the architecture and functionality of the embodiments described herein. Of course, however, the system 1000 or any operation therein may be carried out in any desired environment.

The system 1000 comprises at least one processor and at least one memory, the memory serving to store program instructions corresponding to the operations of the system. As shown, an operation can be implemented in whole or in part using program instructions accessible by a module. The modules are connected to a communication path 1005, and any operation can communicate with other operations over communication path 1005. The modules of the system can, individually or in combination, perform method operations within system 1000. Any operations performed within system 1000 may be performed in any order unless as may be specified in the claims.

The shown embodiment implements a portion of a computer system for configuring and managing storage devices, presented as system 1000, comprising a computer processor to execute a set of program code instructions (module 1010) and modules for accessing memory to hold program code instructions to perform: configuring a plurality of nodes (module 1020), where a node of the plurality of nodes comprises a virtualized controller and one or more user containers, and where the virtualized controller is configured to operate as a storage controller dedicated to the node. Another module serves to configure a plurality of storage devices that are accessed by the one or more user containers, the virtualized controller being configured to manage access by the user containers to the plurality of storage devices (module 1030).

Variations of the foregoing may include more or fewer of the shown modules and variations may perform more or fewer (or different) steps, and/or may use data elements in more, or in fewer (or different) operations.

Strictly as examples, some embodiments include:

- Variations where the one or more user containers run above a hypervisor in a user virtual machine.
- Variations where an isolated virtual machine running above a hypervisor in the node, the isolated virtual machine being configured to run virtualized computers comprising isolated data, the isolated data not being permanently stored on the user virtual machine.
- Variations where the user virtual machine further comprises an interface module configured to retrieve the isolated data from the isolated virtual machine in response to a request from the user containers.
- Variations where the interface module retrieves the data from the isolated virtual machine using a TCP/IP interface.
- Variations where the interface module retrieves the data from the isolated virtual machine using an iSCSI request.
- Variations where the control virtual machine manages a virtual disk that is exposed to the user virtual machine.
- Variations where the virtual disk corresponds to one or more block devices or server targets.
- Variations where a new node that is added to the system corresponds to a new control virtual machine that acts as the storage controller for the new node.
- Variations where a request for storage managed by a second control virtual machine in a second node is sent from a first control virtual machine in a first node to the second node to be handled by the second control virtual machine.
- Variations where the control virtual machine for each of the plurality of nodes corresponds to a same IP address or a same fully-qualified domain name or a same hostname that is isolated by an internal VLAN.
- Variations where the control virtual machine comprises an I/O director module, wherein the I/O director module operates to intercept a request from a user container through the user virtual machine and the I/O director module formats the request into a virtual disk request.
- Variations where the I/O director module comprises an admission control module that determines whether the control virtual machine is permitted to operate upon data storage identified in a request.
- Variations where the I/O director module comprises a virtual disk controller that implements read and write requests.
- Variations where the control virtual machine comprises a distributed metadata service module to maintain metadata for virtual disks managed by the control virtual machine.
- Variations where the control virtual machine comprises a health management module to maintain consistency of metadata for virtual disks managed by the control virtual machine.
- Variations where the control virtual machine comprises a distributed configuration database module to maintain configuration data for the control virtual machine.
- Variations where the distributed configuration database module operates to maintain health information for entities in a system, to handle elections, or to perform consensus management.
- Variations where the user containers comprise one or more operating system components.
- Variations where one or more of the operating system components comprises an application execution environment such as a set of Docker modules.

System Architecture Overview

Additional System Architecture Examples

Figure 11A:
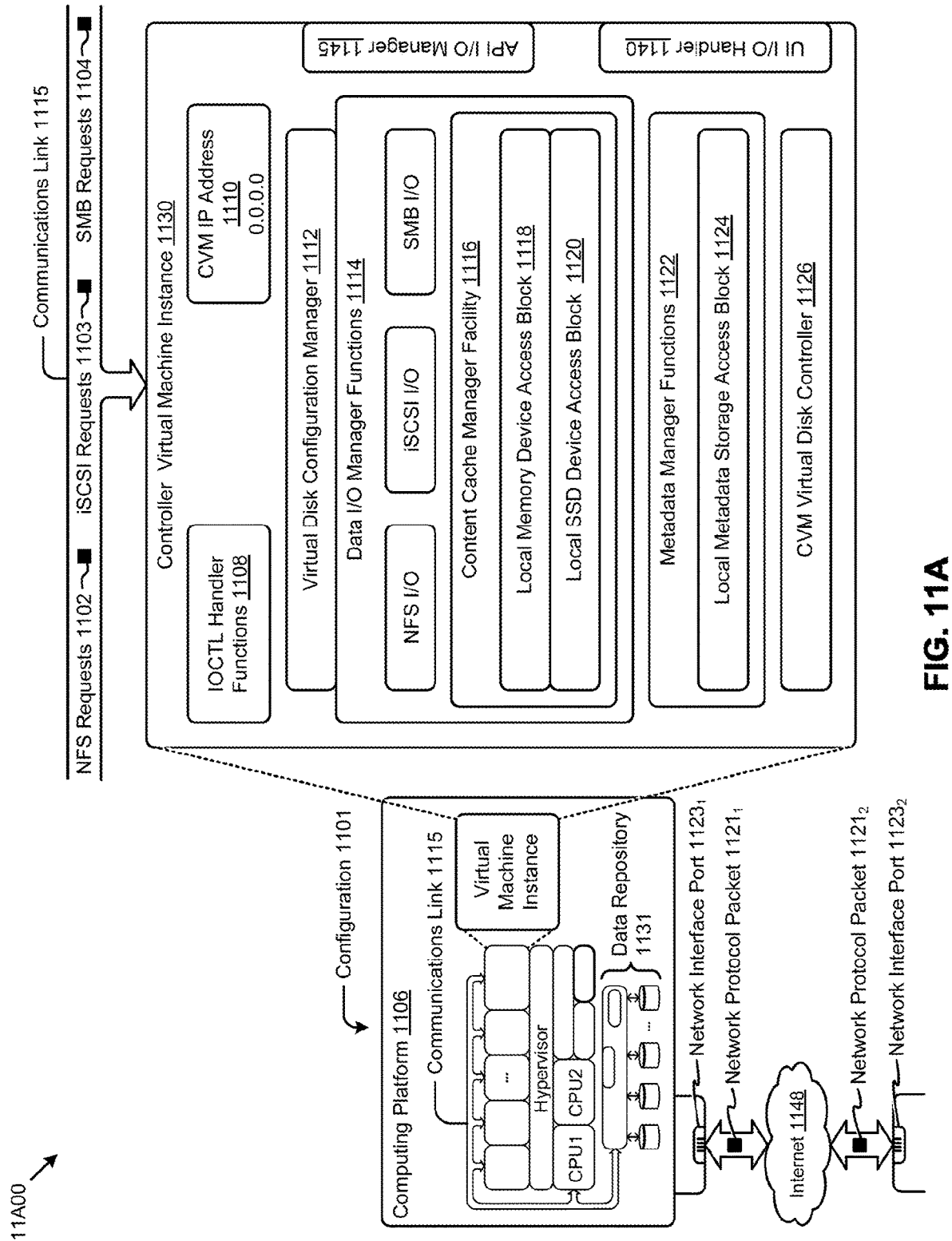
FIG. 11A and FIG. 11B depict virtualized controller architectures comprising collections of interconnected components suitable for implementing embodiments of the present disclosure and/or for use in the herein-described environments.

FIG. 11A depicts a virtualized controller as implemented by the shown virtual machine architecture 11A00. The virtual machine architecture comprises a collection of interconnected components suitable for implementing embodiments of the present disclosure and/or for use in the herein-described environments. Moreover, the shown virtual machine architecture 11A00 includes a virtual machine instance in a configuration 1101 that is further described as pertaining to the controller virtual machine instance 1130. A controller virtual machine instance receives block I/O (input/output or IO) storage requests as network file system (NFS) requests in the form of NFS requests 1102, and/or internet small computer storage interface (iSCSI) block IO requests in the form of iSCSI requests 1103, and/or Samba file system (SMB) requests in the form of SMB requests 1104. The controller virtual machine (CVM) instance publishes and responds to an internet protocol (IP) address (e.g., CVM IP address 1110). Various forms of input and output (I/O or IO) can be handled by one or more IO control handler functions (see IOCTL functions 1108) that interface to other functions such as data IO manager functions 1114 and/or metadata manager functions 1122. As shown, the data IO manager functions can include communication with a virtual disk configuration manager 1112 and/or can include direct or indirect communication with any of various block IO functions (e.g., NFS IO, iSCSI IO, SMB IO, etc.).

In addition to block IO functions, the configuration 1101 supports IO of any form (e.g., block IO, streaming IO, packet-based IO, HTTP traffic, etc.) through either or both of a user interface (UI) handler such as UI IO handler 1140 and/or through any of a range of application programming interfaces (APIs), possibly through the shown API IO manager 1145.

The communications link 1115 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 1130 includes a content cache manager facility 1116 that accesses storage locations, possibly including local dynamic random access memory (DRAM) (e.g., through the local memory device access block 1118) and/or possibly including accesses to local solid state storage (e.g., through local SSD device access block 1120).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1131, which in turn can be formatted into any one or more storage areas, and which can comprise parameterized storage accessible by a key (e.g., a filename, a table name, a block address, an offset address, etc.). An external data repository 1131 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 1124. The external data repository 1131 can be configured using a CVM virtual disk controller 1126, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 1101 can be coupled by a communications link 1115 (e.g., backplane, LAN, PTSN, wired or wireless network, etc.) and each instance may perform respective portions of sequences of instructions as may be required to practice embodiments of the disclosure.

The shown computing platform 1106 is interconnected to the Internet 1148 through one or more network interface ports (e.g., network interface port $1123_1$ and network interface port $1123_2$). The configuration 1101 can be addressed through one or more network interface ports using an IP address. Any operational element within computing platform 1106 can perform sending and receiving operations using any of a range of network protocols, possibly including network protocols that send and receive packets (e.g., network protocol packet $1121_1$ and network protocol packet $1121_2$).

The computing platform 1106 may transmit and receive messages that can be composed of configuration data, and/or any other forms of data and/or instructions organized into a data structure (e.g., communications packets). In some cases, the data structure includes program code instructions (e.g., application code) communicated through Internet 1148 and/or through any one or more instances of communications link 1115. Received program code may be processed and/or executed by a CPU as it is received and/or program code may be stored in any volatile or non-volatile storage for later execution. Program code can be transmitted via an upload (e.g., an upload from an access device over the Internet 1148 to computing platform 1106). Further, program code and/or results of executing program code can be delivered to a particular user via a download (e.g., a download from the computing platform 1106 over the Internet 1148 to an access device).

The configuration 1101 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to managing containers in a virtualization environment.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects pertaining to managing containers in a virtualization environment. Such files or records can be brought into and/or stored in volatile or non-volatile memory.

Figure 11B:
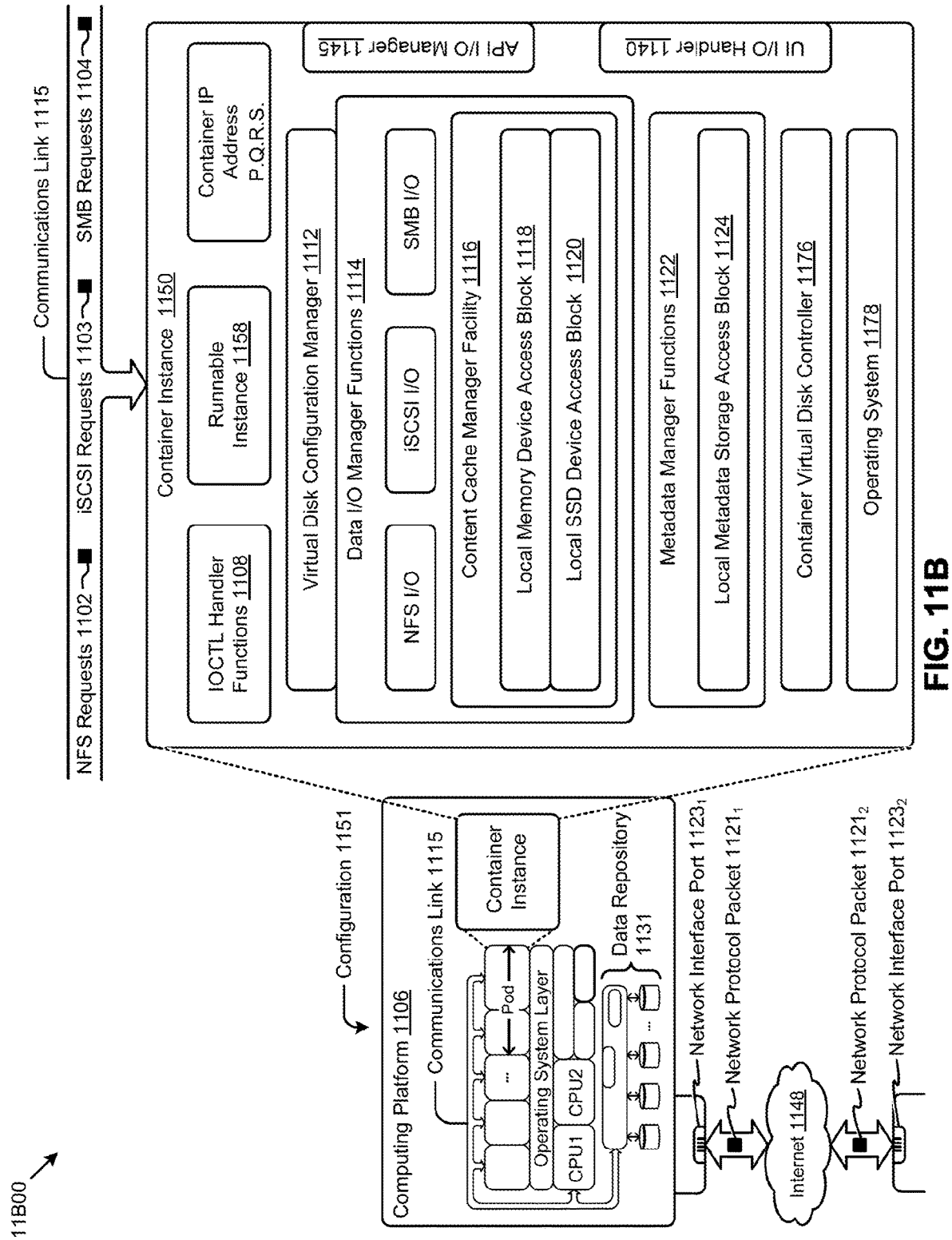

FIG. 11B depicts a virtualized controller implemented by a containerized architecture 11B00. The containerized architecture comprises a collection of interconnected components suitable for implementing embodiments of the present disclosure and/or for use in the herein-described environments.

Moreover, the shown containerized architecture 11B00 includes a container instance in a configuration 1151 that is further described as pertaining to the container instance 1150. The configuration 1151 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 1150). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a virtual machine configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container (e.g., a Docker container) can be rooted in a directory system, and can be accessed by file system commands (e.g., "ls" or "ls -a", etc.). The container might optionally include operating system components 1178, however such separate operating system components need not be provided. Instead, a container can include a runnable instance 1158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 1176. Such a container virtual disk controller can perform any of the functions that the aforementioned CVM virtual disk controller 1126 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when execute a processor causes the processor to perform a set of acts comprising:
    determining a deployment location for an executable container, the deployment location comprising a node of a plurality of nodes forming a hyper-converged environment having a virtualized storage resource, the deployment location being determined using a container service;
    deploying the executable container to a container service machine at the deployment location determined by the container service, wherein the executable container initiates a storage access input/output (I/O) command; and
    processing the storage access I/O command initiated by the executable container at the deployment location to access the virtualized storage resource of the hyper-converged environment.

2. The computer readable medium of claim 1, wherein the container service comprises a control virtual machine that manages a virtual disk accessible using the storage access I/O command initiated by the executable container and the virtual disk managed by the container service corresponds to a block device or a server target.

3. The computer readable medium of claim 1, wherein the container service accesses the virtualized storage resource of the hyper-converged environment to process the storage access I/O command, and the virtualized storage resource of the hyper-converged environment is shared by a plurality of container services.

4. The computer readable medium of claim 1, wherein a request for storage managed by a second container service on a second node is sent from the container service on the node to the second node to be processed by the second container service.

5. The computer readable medium of claim 1, wherein a plurality of container services for each of the plurality of nodes corresponds to a same IP address, a same fully-qualified domain name, or a same hostname that is isolated by an internal VLAN.

6. The computer readable medium of claim 1, wherein the container service formats the storage access I/O command into a request to a virtual disk stored on the virtualized storage resource of the hyper-converged environment.

7. The computer readable medium of claim 1, wherein the container service maintains metadata for virtual disks managed by the container service and the virtualized storage resource of the hyper-converged environment is accessible to a plurality of user virtual machines.

8. The computer readable medium of claim 1, wherein the executable container comprises an operating system component and the storage access I/O command initiated by the executable container is forwarded by the container service without modification.

9. The computer readable medium of claim 1, wherein the container service the executable container is part of a group of executable containers that are deployed at the same node as a swarm.

10. A method comprising:
   determining a deployment location for an executable container, the deployment location comprising a node of a plurality of nodes forming a hyper-converged environment having a virtualized storage resource, the deployment location being determined using a container service;
   deploying the executable container to a container service machine at the deployment location determined by the container service, wherein the executable container initiates a storage access input/output (I/O) command; and
   processing the storage access I/O command initiated by the executable container at the deployment location to access the virtualized storage resource of the hyper-converged environment.

11. The method of claim 10, wherein the container service comprises a control virtual machine that manages a virtual disk accessible using the storage access I/O command initiated by the executable container and the virtual disk managed by the container service corresponds to a block device or a server target.

12. The method of claim 10, wherein the container service accesses the virtualized storage resource of the hyper-converged environment to process the storage access I/O command, and the virtualized storage resource of the hyper-converged environment is shared by a plurality of container services.

13. The method of claim 10, wherein a request for storage managed by a second container service on a second node is sent from the container service on the node to the second node to be processed by the second container service.

14. The method of claim 10, wherein a plurality of container services for each of the plurality of nodes corresponds to a same IP address, a same fully-qualified domain name, or a same hostname that is isolated by an internal VLAN.

15. The method of claim 10, wherein the container service formats the storage access I/O command into a request to a virtual disk stored on the virtualized storage resource of the hyper-converged environment.

16. The method of claim 10, wherein the container service maintains metadata for virtual disks managed by the container service and the virtualized storage resource of the hyper-converged environment is accessible to a plurality of user virtual machines.

17. The method of claim 10, wherein the container service the executable container is part of a group of executable containers that are deployed at the same node as a swarm.

18. A system comprising:
   a storage medium having stored thereon a sequence of instructions; and
   a processor that executes the sequence of instructions to perform a set of acts comprising:
      determining a deployment location for an executable container, the deployment location comprising a node of a plurality of nodes forming a hyper-converged environment having a virtualized storage resource, the deployment location being determined using a container service;
      deploying the executable container to a container service machine at the deployment location determined by the container service, wherein the executable container initiates a storage access input/output (I/O) command; and
      processing the storage access I/O command initiated by the executable container at the deployment location to access the virtualized storage resource of the hyper-converged environment.

19. The system of claim 18, wherein the container service comprises a control virtual machine that manages a virtual disk accessible using the storage access I/O command initiated by the executable container and the virtual disk managed by the container service corresponds to a block device or a server target.

20. The system of claim 18, wherein the container service accesses the virtualized storage resource of the hyper-converged environment to process the storage access I/O command, and the virtualized storage resource of the hyper-converged environment is shared by a plurality of container services.

21. The system of claim 18, wherein a request for storage managed by a second container service on a second node is sent from the container service on the node to the second node to be processed by the second container service.

22. The system of claim 18, wherein a plurality of container services for each of the plurality of nodes corresponds to a same IP address, a same fully-qualified domain name, or a same hostname that is isolated by an internal VLAN.

23. The system of claim 18, wherein the container service formats the storage access I/O command into a request to a virtual disk stored on the virtualized storage resource of the hyper-converged environment.

24. The system of claim 18, wherein the container service maintains metadata for virtual disks managed by the container service and the virtualized storage resource of the hyper-converged environment is accessible to a plurality of user virtual machines.

25. The system of claim 18, wherein the executable container comprises an operating system component and the storage access I/O command initiated by the executable container is forwarded by the container service without modification.

* * * * *